(12) United States Patent
Gorian et al.

(10) Patent No.: US 8,097,855 B2
(45) Date of Patent: Jan. 17, 2012

(54) METHODS AND SYSTEMS FOR DETECTING CONCEALED OBJECTS

(75) Inventors: Izrail Gorian, Watertown, MA (US); Galina Doubinina, Watertown, MA (US); Mikhail Shterenberg, Chestnut Hill, MA (US); Igor Joseph Pogorelsky, Brookline, MA (US); Henry Droznin, Bedford, MA (US)

(73) Assignee: Iscon Video Imaging, Inc., Woburn, MA (US)

( * ) Notice: Subject to any disclaimer, the term of this patent is extended or adjusted under 35 U.S.C. 154(b) by 371 days.

(21) Appl. No.: 12/465,178

(22) Filed: May 13, 2009

(65) Prior Publication Data
US 2009/0294667 A1    Dec. 3, 2009

Related U.S. Application Data

(63) Continuation-in-part of application No. 12/034,874, filed on Feb. 21, 2008, now Pat. No. 7,664,324, which is a continuation-in-part of application No. 11/312,898, filed on Dec. 20, 2005, now Pat. No. 7,657,092.

(60) Provisional application No. 61/053,076, filed on May 14, 2008, provisional application No. 60/740,743, filed on Nov. 30, 2005.

(51) Int. Cl.
*G01J 5/02* (2006.01)

(52) U.S. Cl. ............ 250/341.6; 250/332; 250/334; 382/100; 382/103; 382/181; 702/131; 702/134

(58) Field of Classification Search ........... 250/332, 250/334, 341.6; 382/100, 103, 181; 702/131, 702/134
See application file for complete search history.

(56) References Cited

U.S. PATENT DOCUMENTS

| 5,007,432 | A | 4/1991 | Keller et al. |
| 5,070,242 | A | 12/1991 | McClelland et al. |
| 5,227,800 | A | 7/1993 | Huguenin et al. |
| 6,216,540 | B1 * | 4/2001 | Nelson et al. ........... 73/633 |
| 6,234,669 | B1 | 5/2001 | Kienitz et al. |
| 6,353,224 | B1 | 3/2002 | Sinclair et al. |
| 6,359,582 | B1 | 3/2002 | MacAleese et al. |
| 6,442,419 | B1 | 8/2002 | Chu et al. |
| 6,570,956 | B1 | 5/2003 | Rhee et al. |
| 6,940,071 | B2 | 9/2005 | Ramsden et al. |
| 7,167,123 | B2 | 1/2007 | Hausner et al. |

(Continued)

FOREIGN PATENT DOCUMENTS

JP      2002530130 A      9/2002

(Continued)

OTHER PUBLICATIONS

International Search Report dated Jan. 6, 2010 for PCT/US09/043969. Applicant: Iscon Video Imaging, Inc.

(Continued)

*Primary Examiner* — David Porta
*Assistant Examiner* — Djura Malevic
(74) *Attorney, Agent, or Firm* — Burns & Levinson LLP; Orlando Lopez

(57) ABSTRACT

Methods and systems for detecting the presence of concealed objects that can be utilized at locations where conventional methods cannot be utilized are disclosed. One embodiment of the method of these teachings for detecting the presence of concealed objects uses thermal radiation of a body as a source of radiation. Other embodiments include portable and handheld systems, devices, methods, and apparatus to determine the presence of a concealed object.

34 Claims, 32 Drawing Sheets

U.S. PATENT DOCUMENTS

| | | |
|---|---|---|
| 7,202,478 B2 | 4/2007 | Ramsden et al. |
| 7,365,672 B2 | 4/2008 | Keller et al. |
| 7,558,370 B2 | 7/2009 | Sommer, Jr. et al. |
| 2004/0000645 A1 | 1/2004 | Ramsden et al. |
| 2005/0110672 A1 | 5/2005 | Cardiasmenos et al. |
| 2006/0262902 A1 | 11/2006 | Wattenburg |
| 2007/0075246 A1 | 4/2007 | Gatt |
| 2008/0129581 A1 | 6/2008 | Douglass et al. |
| 2008/0195347 A1 | 8/2008 | Gatt |

FOREIGN PATENT DOCUMENTS

| | | |
|---|---|---|
| WO | 2000029836 A | 5/2000 |

OTHER PUBLICATIONS

Notification of Transmittal of the International Search Report and the Written Opinion of the Internatioal Searching Authority, or the Declaration, International Application No. PCT/US2009/043969, filed May 14, 2009.

Notication Concerning Transmittal of Copy of International Preliminary Report on Patentability, International Application No. PCT/US2009/043969, filed May 14, 2009.

International Search Report dated Feb. 26, 2009 for PCT/US08/54513. Applicant: Iscon Video Imaging, Inc.

Mukesh, M.C. et al. Survey of Image Denoising Techniques. Proc. of GSPx 2004 (Sep. 27-30, 2004) 1-7.

Scheunders, P. Denoising of multispectral images using wavelet thresholding. Proc. SPIE Image and Signal Proc. For Remote Sensing IX (2003) 28-35.

Pratt, W. K. Digital Image Processing. John Wiley & Sons (1978). ISBN 0-471-01888-0, 311-318.

Young, T. Y. et al (Eds). Handbook of Pattern Recognition and Image Processing. Harcourt Brace Jovanovich (1986). ISBN 0-121-7745600-2. Chapter 9 "Image Segmentation", 215-231.

Trier, O.D. et al. Evaluation of Binarization Methods for Document Images. IEEE Trans. on Pattern Anal. and Machine Intell. 17 (1995) 312-315.

Liapsis, S. et al. Colour and texture segmentation using wavelet frame analysis, deterministic relaxation, and fast marching algorithms. J. Vis. Commun. Image R. 15 (2004) 1-26.

Keyes, L. et al. Using Moment Invariants for Classifying Shapes on Large-Scale Maps. Computers, Environment and Urban Systems 25. (2001) Available at http://eprints.may.ie/archive/00000064/. Downloaded Jul. 27, 2007.

Torres, R.S. et al. A Graph-based Approach for Multiscale Shape Analysis. Pattern Recognition 37(6) (2004) 1163-1174.

Kervrann, C. et al. A Markov Random Field model-based approach to unsupervised texture segmentation using local and global spatial statistics. IEEE Trans. on Image Process. 4(6) 1995, 856-862.

Trier, O.D. et al. Feature Extraction Methods for Character Recognition—a Survey. Pattern Recognition 29(4) 1996, 641-662.

De Castro, F.C.C. et al. Invariant Pattern Recognition of 2D Images Using Neural Networks and Frequency-Domain Representation. Int'l Conf. on Neural Networks 3(9), 1997, 1644—649.

\* cited by examiner

METHODS AND SYSTEMS FOR DETECTING CONCEALED OBJECTS

CROSS REFERENCE TO RELATED APPLICATIONS

This application claims priority of U.S. Provisional Patent Application Ser. No. 61/053,076, METHODS AND SYSTEMS FOR DETECTING CONCEALED OBJECTS, filed on May 14, 2008, which is incorporated by reference herein in its entirety, and is a continuation-in-part of U.S. patent application Ser. No. 12/034,874, filed on Feb. 21, 2008, which is a continuation in part of U.S. patent application Ser. No. 11/312,898, filed on Dec. 20, 2005, which claims priority of U.S. Provisional Application 60/740,743, "METHODS AND SYSTEMS FOR DETECTING CONCEALED OBJECTS," filed on Nov. 30, 2005, all of which are incorporated by reference herein in their entirety.

BACKGROUND

The present teachings relates to detection of concealed objects.

The detection of weapons, contraband, and other concealed objects is of significant interest at security checkpoints and the like. Explosives detection for aviation security has been an area of federal concern for many years.

Much effort has been focused on direct detection of explosive materials in carry-on and checked luggage, but techniques have also been developed to detect and identify residual traces that may indicate a passenger's recent contact with explosive materials. The trace detection techniques use separation and detection technologies, such as mass spectrometry, gas chromatography, chemical luminescence, or ion mobility spectrometry, to measure the chemical properties of vapor or particulate matter collected from passengers or their carry-on luggage. Parallel efforts in explosives vapor detection have employed specially trained animals, usually dogs, as detectors.

The effectiveness of chemical trace analysis is highly dependent on three distinct steps: (1) sample collection, (2) sample analysis, and (3) comparison of results with known standards. If any of these steps is suboptimal, the test may fail to detect explosives that are present. When trace analysis is used for passenger screening, additional goals may include nonintrusive or minimally intrusive sample collection, fast sample analysis and identification, and low cost. While no universal solution has yet been achieved, ion mobility spectrometry is most often used in currently deployed equipment.

Several technologies have been developed and deployed on a test or prototype basis. One approach is to direct passengers through a portal, similar to a large doorframe, that contains detectors able to collect, analyze, and identify explosive residues on the person's body or clothing. The portal may rely on the passenger's own body heat to volatilize traces of explosive material for detection as a vapor, or it may use puffs of air that can dislodge small particles as an aerosol. Alternatively, a handheld vacuum "wand" may be used to collect a sample. In both cases, the collected samples are analyzed chemically.

A different approach is to test an object handled by the passenger, such as a boarding pass, for residues transferred from the passenger's hands. In this case, the secondary object is used as the carrier between the passenger and the analyzing equipment. The olfactory ability of dogs is sensitive enough to detect trace amounts of many compounds, but several factors have inhibited the regular use of canines as passenger explosives trace detectors. Dogs trained in explosives detection can generally only work for brief periods, have significant upkeep costs, are unable to communicate the identity of the detected explosives residue, and require a human handler when performing their detection role. In addition, direct contact between dogs and airline passengers raises liability concerns.

Metallic objects can be detected utilizing a magnetometer. Unfortunately, this approach does not detect most organic polymer and composite materials that may be used to fabricate firearms, explosives, and other objects which are frequently the subject of security inspections.

In another approach, millimeter wave electromagnetic radiation is applied to provide images that can reveal objects concealed by clothing. This approach typically depends on the ability of a human inspector to visually detect one or more suspect objects from the resulting image. Accordingly, there are intrinsic speed limitations in these approaches, and such approaches are subject to variation with the ability of different inspectors. Moreover, because these systems can provide detailed images of body parts that are ordinarily intended to be hidden by clothing, utilization of a human inspector can be embarrassing to the person being inspected, and may pose a concern that privacy rights are being violated. Thus, there is an on going demand for further contributions in this area of technology.

In conventional systems, infrared detection of concealed objects has failed in the most cases because infrared camera reacts only on heat differences between the object under cloth and background cloth. If an object is in contact with a body (for example, a human body) for long enough to come to approximate thermal equilibrium, this difference in some cases will be negligible and contrast of the concealed object (for example, under cloth) is not enough for detection.

BRIEF SUMMARY

One embodiment of the method of these teachings for detecting the presence of concealed objects uses thermal radiation of a body as a source of radiation. A temperature modifying component disturbs a thermal balance in the emitting body. Other embodiments include unique portable systems, devices, apparatus to determine the presence of a concealed object and methods for their application.

In one instance, an embodiment of the system of these teachings includes a frame having at least one handle and a temperature modifying component capable of modifying the temperature distribution of an emitting body, one or more image acquisition devices capable of receiving electromagnetic radiation from the emitting body and of acquiring an image of the emitting body from the received electromagnetic radiation, both of which are operatively connected to the frame.

In another instance, an embodiment of the system of these teachings also includes an analysis component capable of identifying one or more regions in the image, the analysis component being capable of receiving one or more images from the one or more image acquisition devices.

Hand-held portable devices of these teachings allow detection of objects at such places of the subject (for example between legs) where conventional technologies have blind spots and patting is not a permissible operation.

Methods of utilizing the portable system of these teachings and computer usable medium having computer readable code embodied therein, the computer readable code being capable of causing one or more processors to execute the methods of these teachings, are also disclosed.

For a better understanding of the present invention, together with other and further needs thereof, reference is made to the accompanying drawings and detailed description and its scope will be pointed out in the appended claims.

DETAILED DESCRIPTION

In one instance, an embodiment of the system of these teachings includes one or more temperature modifying components capable of modifying the temperature distribution of an emitting body, one or more image acquisition devices capable of receiving electromagnetic radiation from the emitting body and of acquiring an image of the emitting body from the received electromagnetic radiation.

In another instance, an embodiment of the system of these teachings also includes an analysis component capable of identifying one or more regions in the image, the analysis component being capable of receiving one or more images from the one or more image acquisition devices.

In one embodiment of these teachings, the thermal balance in the emitting body is disturbed by preheating or precooling. The image contrast for a concealed object is increased and the concealed object can be detected. In one embodiment, detection is by an operator; in another embodiment, detection is by an automatic device.

Figure 1:
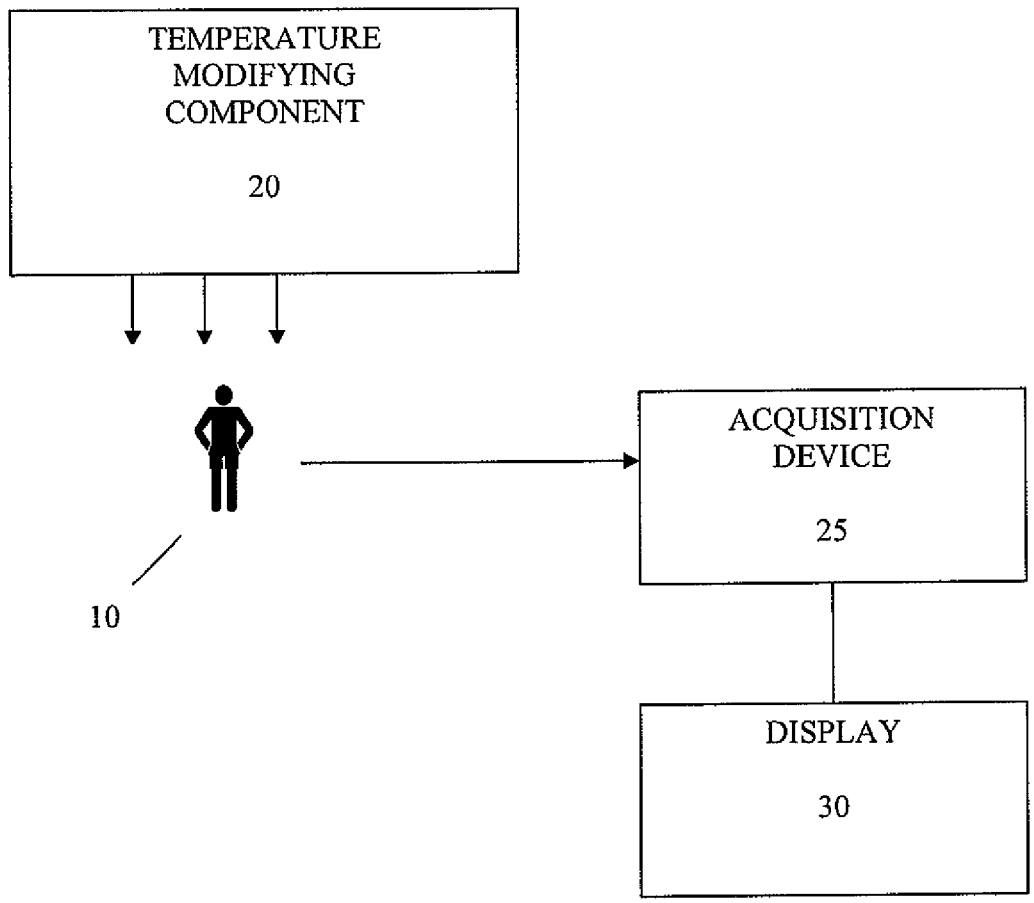
FIG. 1 is a graphical schematic representation of an embodiment of the system of these teachings.

One embodiment of the system of these teachings is shown in FIG. 1. Referring to FIG. 1, the one or more temperature modifying components 20 modifies the temperature distribution of a body 10. The body 10 emits electromagnetic radiation that is received by one or more acquisition devices 25. The one or more acquisition devices 25 acquire one or more images obtained from the received electromagnetic radiation. In one embodiment, the body 10 emits infrared electromagnetic radiation having a wavelength between about $0.75\mu$ to about $1000\mu$. (The infrared range of electromagnetic radiation is typically divided into a near infrared range, from about $0.75\mu$ to about $1.4\mu$, a short wavelength infrared range, from about $1.4\mu$ to about $3\mu$, a mid wavelength infrared range, from about $3\mu$ to about $8\mu$, a long wavelength infrared range, from about $8\mu$ to $15\mu$, and a far infrared range from about $15\mu$ to about $1000\mu$. It should be noted that the systems of these teachings can be utilized in any of these ranges or in any combination of this ranges.) In one instance, the acquisition device 25 is an infrared camera. In the embodiment shown in FIG. 1, the one or more images obtained by the one or more acquisition devices 25 are provided to one or more displays 30.

Modifying the temperature distribution of a body having a concealed object (such as, but not limited to, and object concealed under clothing covering the body), allows detection of the concealed object from an image obtained from the electromagnetic radiation emitted by the body. Such modification can be achieved, in one instance, by disturbing the thermal balance between the emitting body and the concealed object(s).

The modification of the temperature distribution of the body 10 can be obtained by heating the body 10 by means of the one or more temperature modifying components 20, cooling the body 10 by means of the one or more temperature modifying components 20, or a combination of cooling and heating. In one instance, the temperature modification is obtained by convection or by convection with forced air (such as, but not limited to, providing a stream of air at a different temperature, the stream being directed at the body 10). In one embodiment the stream of air (gas) is produced by a forced flow component (a fan in one embodiment). It should be noted that, while in some embodiments a single temperature modifying component, other embodiments have a number of temperature modifying components. Embodiments in which the temperature modifying components are placed at different locations of the body (around the periphery) in order to obtain temperature modification over the entire body are within the scope of these teachings.

Figure 2:
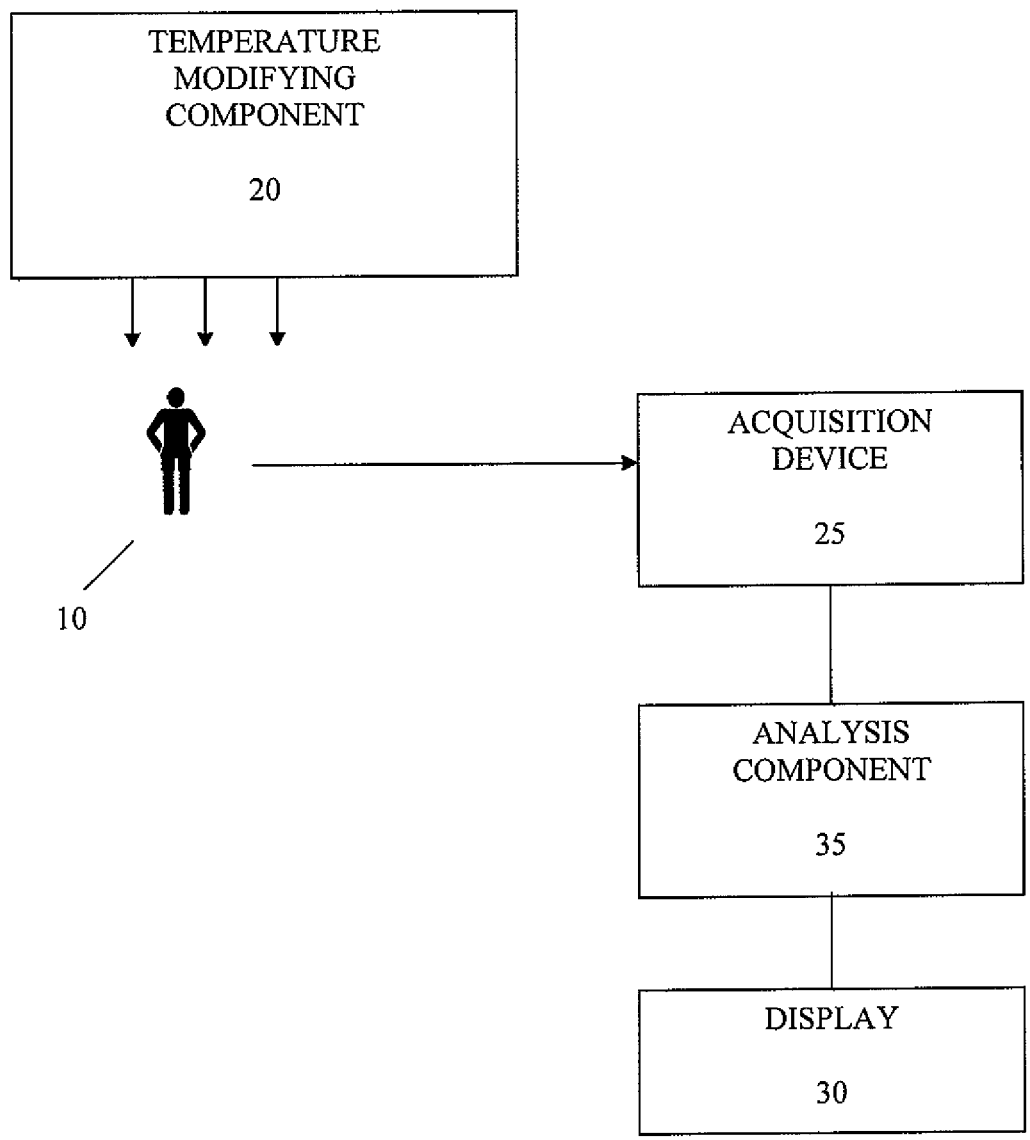
FIG. 2 is a graphical schematic representation of another embodiment of the system of these teachings

Another embodiment of the system of these teachings is shown in FIG. 2. Referring to FIG. 2, the system shown therein also includes an analysis component 35 receiving the one or more images from the one or more image acquisition devices 25. The analysis component 35 is capable of identifying one or more regions in the one or more images. The one or more images having the one or more regions identified are then provided to the display 30.

In one instance, the analysis component 35 is also capable of enhancing an image attribute in the one or more regions. Exemplary embodiments of the image attribute are, but not limited to, contrast or color. The one or more images having the enhanced image attribute in the one or more regions are then provided to the display 30.

Figure 3:
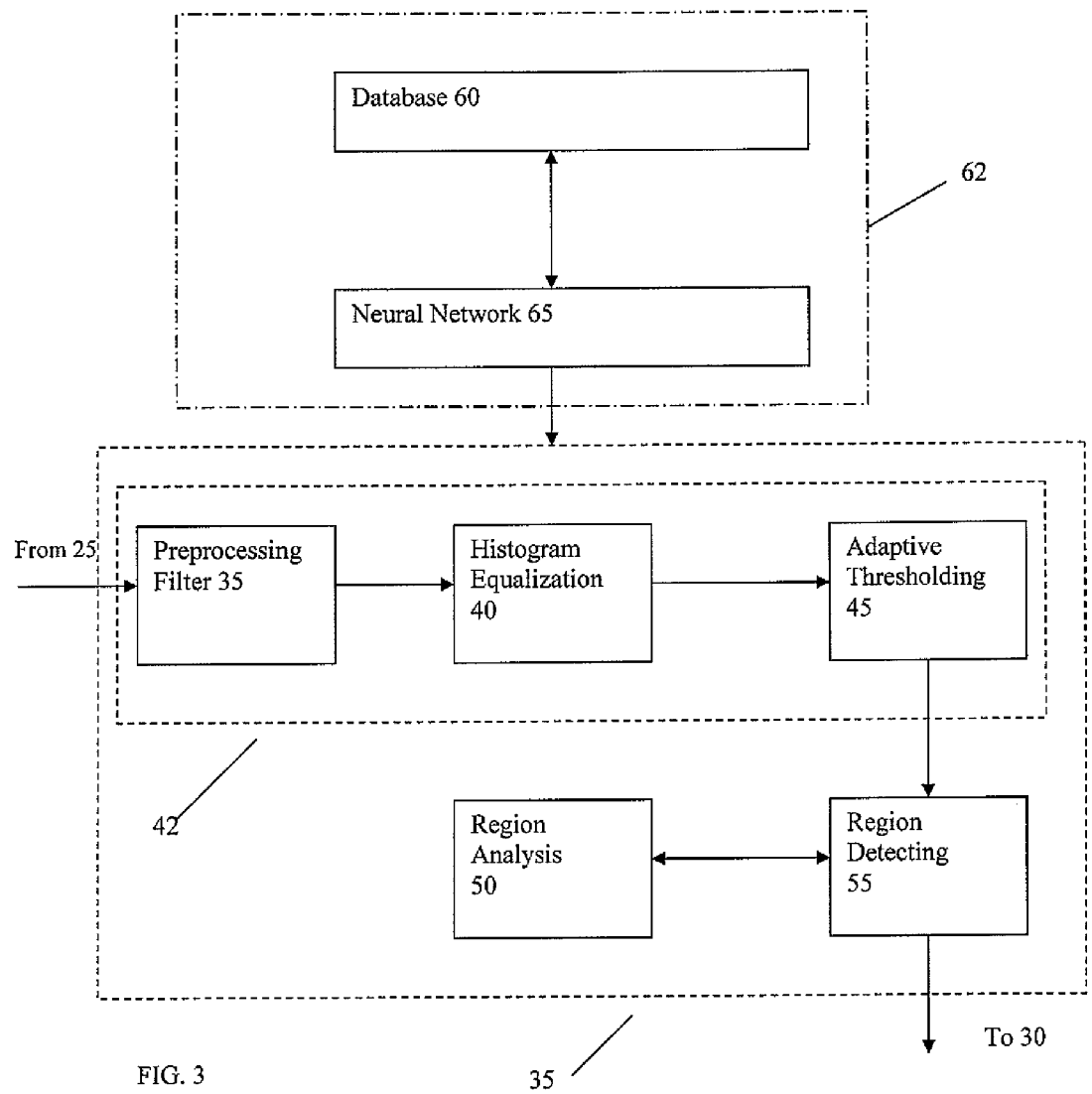
FIG. 3 is a schematic block diagram representation of an embodiment of the analysis component of an embodiment of the system of these teachings.

A block diagram representation of an embodiment of the analysis component 35 is shown in FIG. 3. Referring to FIG. 3, the embodiment shown therein includes a pre-processing component 42 capable of enhancing detectability of the one or more regions in the one or more images received from the acquisition device 25. The embodiment shown in FIG. 3 also includes a region detecting component 55 capable of identifying the one or more regions in the one or more preprocessed images and a region analysis component 50 capable of determining characteristics of the one or more regions. In one instance, but these teachings is not limited to only this embodiment, the characteristics include moment invariants.

In the embodiment shown in FIG. 3, the preprocessing component 42 includes a noise reduction component 37 capable of increasing a signal to noise ratio in the one or more images and a contrast enhancing component. The contrast enhancing component, in the embodiment shown in FIG. 3, includes a histogram equalization component 40 (see, for example, W. K. Pratt, Digital image Processing, ISBN0-471-01888-0, pp. 311-318, which is incorporated by reference herein) and an adaptive thresholding component 45 capable of binarizing an output of the histogram equalization component 40. (For adaptive thresholding, see, for example, but not limited to, Ø.D. Trier and T. Taxt, Evaluation of binarization methods for document images, available at http://citeseer.nj.nec.com/trier95evaluation.html, also a short version published in IEEE Transaction on Pattern Analysis and Machine Intelligence, 17, pp. 312-315, 1995, both of which are incorporated by reference herein.) In one embodiment, the binary output of the histogram equalization component is downsampled to obtain a downsampled image (in order to save processing time of the region detecting component 55). In one instance, the noise reduction component 37 is an adaptive noise reduction filter such as, but not limited to, a wavelet based noise reduction filter (see, for example, Mukesh Motwani, Mukesh Gadiya, Rakhi Motwani, and Frederick C. Harris, Jr., "A Survey of Image Denoising Techniques," in Proceedings of GSPx 2004, Sep. 27-30, 2004, Santa Clara Convention Center, Santa Clara, Calif., and Scheunders P. Denoising of multispectral images using wavelet thresholding.—Proceedings of the SPIE Image and Signal Processing for Remote Sensing IX, 2003, p. 28-35, both of which are incorporated by reference herein).

In one instance of the embodiment shown in FIG. 3, the region detecting component 55 includes segmentation to identify the one or more regions. (See for example, but not limited to, Ch. 9, Image Segmentation, in Handbook of Pattern Recognition and Image Processing, ISBN 0-121-774560-2, which is incorporated by reference herein, C. Kervrann and F. Heitz, "A Markov random field model based approach to unsupervised texture segmentation using local and global spatial statistics," IEEE Transactions on Image Processing, vol. 4, no. 6, 1995, 856-862. http://citeseer.ist.psu.edu/kervrann93markov.html, which is incorporated by reference herein, and S. Liapis and E. Sifakis and G. Tziritas, "Colour and Texture Segmentation Using Wavelet Frame Analysis, Deterministic Relaxation, and Fast Marching Algorithms," http://citeseer.ist.psu.edu/liapis04colour.html, which is incorporated by reference herein.) In one embodiment, the region detecting component 55 labels each connective area (region) by unique label. Each region labeled is processed by the region analysis component 50 in order to determine shape characteristics (moment invariants, in one embodiment).

In one instance of the embodiment shown in FIG. 3, the region analysis component 50 characteristics include moment invariants (see for example, Keyes, Laura and Winstanley, Adam C. (2001) USING MOMENT INVARIANTS FOR CLASSIFYING SHAPES ON LARGE_SCALE MAPS. Computers, Environment and Urban Systems 25. available at http://eprints.may.ie/archive/00000064/, which is incorporated by reference herein). In the embodiment in which shape characteristics are important for object detection, the moments will identify concealed objects. (For example, circled objects have all moments starting from the second equal zero. Symmetrical objects have specific moments, etc.) Other embodiments of the characteristics obtained from the region analysis component 50 include, but are not limited to, multiscale fractal dimension and contour saliences, obtained using the image foresting transform, fractal dimension and Fourier descriptors (see for example, R. Torres, A. Falcao, and L. Costa. A graph-based approach for multiscale shape analysis. Pattern Recognition, 37(6):1163-1174, 2004, available at http://citeseer.ist.psu.edu/torres03graphbased.html, which is incorporated by reference herein).

In one instance, if a region with given characteristics (a given moment) values is detected, the region provided to the one or more displays 30 is enhanced by contrast, or by color.

In one instance, in the embodiments described above, some of the elements of the analysis component 35, such as, but not limited to, the noise reduction filter 37, histogram equalization component 40, the adaptive thresholding component 45, or/and the unsupervised segmentation component 55, are adaptive. Adaptation can be accomplished or enhanced by means of an adaptation component 62. In one embodiment, the adaptation component 62 includes a database 60 (in one instance, a computer usable medium for storing data for access by a computer readable code, the computer usable medium including a data structure stored in the computer usable medium, the data structure including information resident in a database, referred to as "a database") and a neural network component 65. It should be noted that although the embodiment shown in FIG. 3 utilizes a neural network for the adaptation (including optimizing of parameters), other methods of optimization are also within the scope of these teachings. The adaptation component 62 can, in one embodiment, include a component utilizing artificial intelligence or decision logic (including fuzzy decision logic). In one embodiment, substantially optimal parameters of some of the elements of the analysis component 35, such as, but not limited to, the noise reduction filter 37, histogram equalization component 40, the adaptive thresholding component 45, or/and the unsupervised segmentation component 55, are determined (within a training procedure) by means of the neural network 65 and the database 60.

Figure 4:
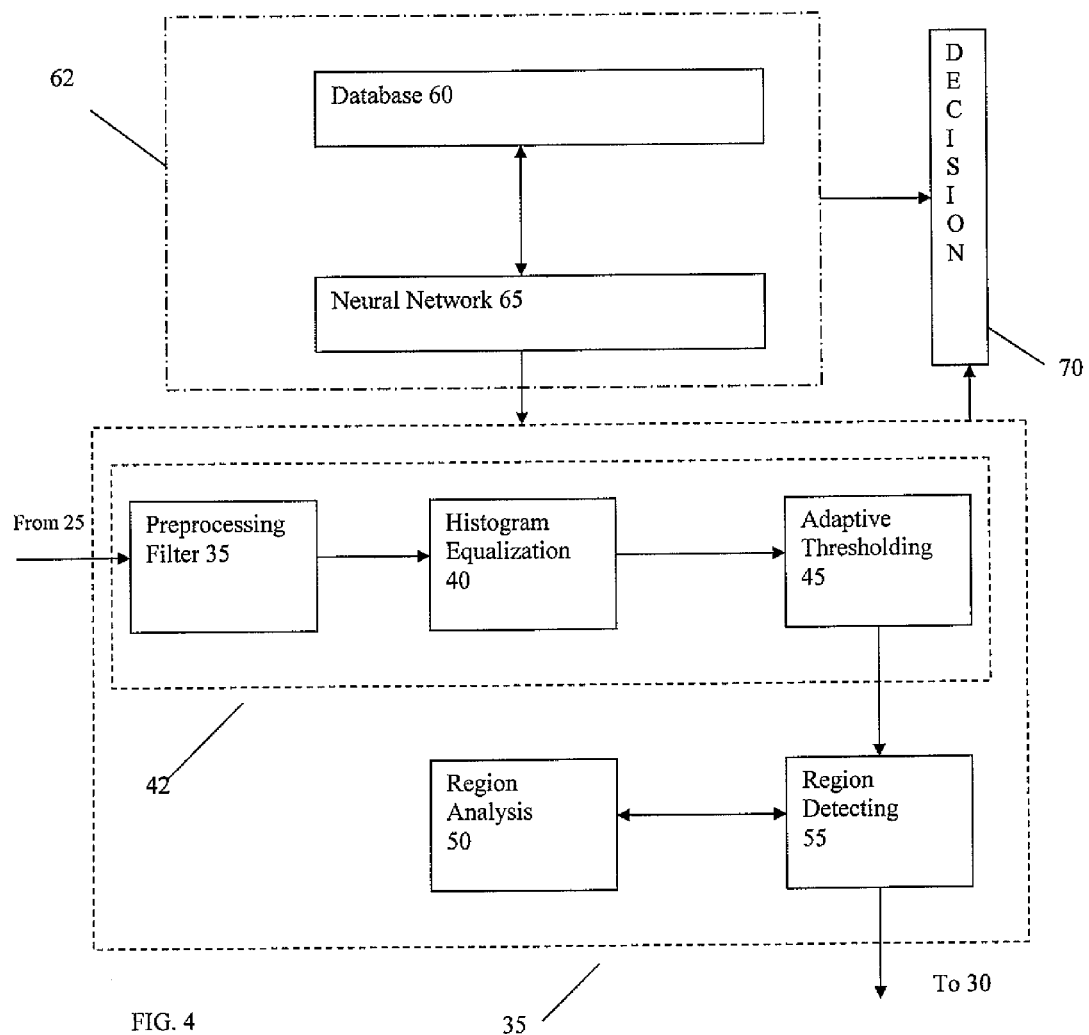
FIG. 4 shows a schematic block diagram representation of another embodiment of the analysis component of an embodiment of the system of these teachings.

FIG. 4 shows another block diagram representation of an embodiment of the analysis component 35. Referring to FIG. 4, the output of the region processing component 55 including the shape characteristics (moment invariants) and input from an optimizing component (the neural network) and the database are provided to a decision component 70. The decision component 70 can be, but is not limited to, a component utilizing artificial intelligence or another neural network or decision logic (including fuzzy decision logic) (see for example, O. D. Trier, A. K. Jain and T. Taxt, "Feature extraction methods for character recognition—A survey," Pattern Recognition 29, pp. 641-662, 1996, available at http://citeseer.ist.psu.edu/trier95feature.html, which is incorporated by reference herein, Fernando Cesar C. De Castro et al, "Invariant Pattern Recognition of 2D Images Using Neural Networks and Frequency-Domain Representation," available at http://citeseer.ist.psu.edu/29898.html, which is also incorporated by reference herein). The decision component 70, in one embodiment, can supplement or replace the display 30 or, in another embodiment, can provide an alarm.

During application of an embodiment of the system of these teachings, the presence of concealed objects is detected by modifying a temperature distribution of an emitting body (where the emitting body may contain concealed objects), acquiring one or more images produced by the electromagnetic radiation emanating from the emitting body after the temperature distribution has been modified, and providing the one of more images for detection of the presence of concealed objects. In one embodiment, the method of detecting the presence of concealed objects can include enhancing the detectability of one or more regions in the one or more acquired images before providing the one or more images for detection of the presence of concealed objects. In another instance, the method can also include identifying the one or more regions in the one or more images and determining characteristics of the one or more regions. In yet another instance, the method includes enhancing an image attribute in the one or more regions and displaying the one or more images. In another embodiment, the method of these teachings also includes detecting the presence of concealed objects from the identified one or more regions and the characteristics (such as, but not limited to, moment invariants) of the one or more regions.

In a further instance of the method of these teachings, at least one step from the steps of enhancing detectability of one or more regions, identifying the at least one region or determining characteristics of the at least one region is performed adaptively and the method also includes the step of enabling substantially optimal performance of the at least one adaptive step.

In one embodiment, the step of enhancing detectability of one or more regions includes increasing a signal to noise ratio in the one or more images. In another embodiment, the detectability is enhanced by enhancing contrast of the one or more images.

Figure 5:
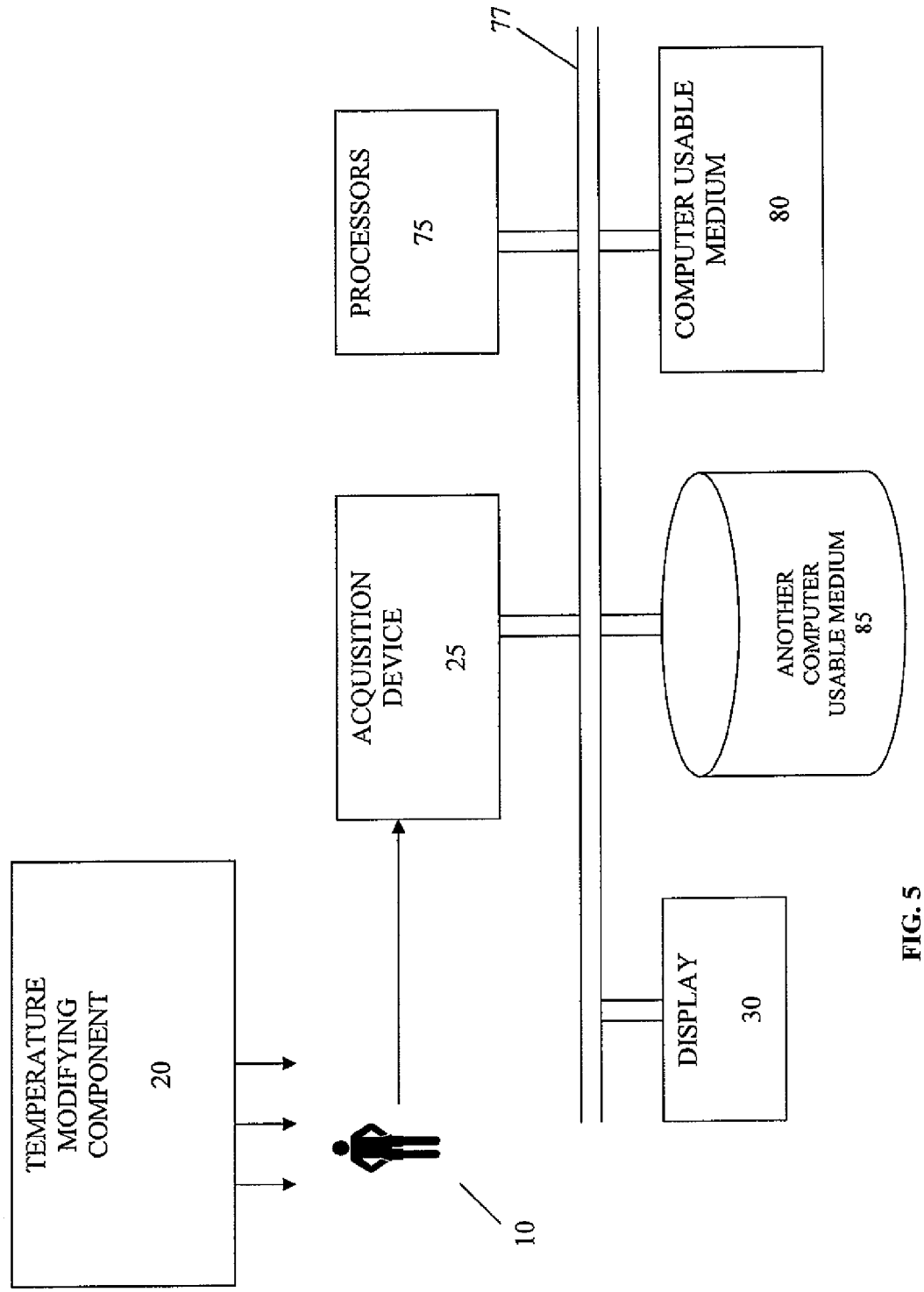
FIG. 5 is a graphical schematic representation of yet another embodiment of the system of these teachings.

FIG. 5 is a graphical schematic representation of yet another embodiment of the system of these teachings. Referring to FIG. 5, the embodiment shown therein includes the one or more temperature modifying components 20 capable of modifying the temperature distribution of the emitting body 10, the one or more image acquisition devices 25 capable of receiving the electromagnetic radiation emanating from the emitting body 10 and of acquiring one or more images of the emitting body 10 from the received electromagnetic radiation. In the embodiment shown in FIG. 5, the one or more acquisition devices 25 are operatively connected to one or more processors 75 and to one or more computer usable media 80. The one or more computer usable media 80 has computer readable code embodied therein, the computer readable code being capable of causing the one or more processors to execute the methods of these teachings. In one embodiment, the computer readable code is capable of causing the one or more processors 70 to receive the one or more images from the one or more image acquisition devices 25, to enhance the detectability of one of more regions in the one or more images and to provide the one or more images to a detection component.

In one instance, the detection component is the display 30, which is also operatively connected to the one or more processors 70. In another instance, the detection component includes computer readable code embodied in the one or more computer usable media 80 and another computer usable medium 85 for storing data for access by the computer readable code, the other computer usable medium comprising a data structure stored in the other computer usable medium 85, the data structure including information resident in a database used by the computer readable code in detecting the presence of objects. It should be noted that embodiments in which the one or more computer usable media 80 and the other computer usable medium 85 are the same computer usable medium are within the scope of these teachings.

The display element 30, the one or more acquisition devices 25, the one or more processors 70, the computer usable medium 80, and the other computer usable medium 85 are operatively connected by means of a connection component 77 (the connection component may be, for example, a computer bus, or a carrier wave).

The block diagram representation of an embodiment of the analysis component 35 shown in FIG. 3 or 4 can be implemented, in one embodiment, by means of the computer readable code embodied in the one or more computer usable media 80 and, in some instances, by means of the data structure, including information resident in the database, comprised in the other computer usable medium 85. In those embodiment, the computer readable code is also capable of causing there one or more processors 72 identify one or more regions in the one or more images and to determine characteristics of the one or more regions, or/and increase a signal to noise ratio in the one or more images, or/and enhance contrast into one or more images.

In one instance, the computer readable code is capable of causing the one or more processors 70 to utilize wavelet based noise reduction methods. In another instance, the computer readable code is capable of causing the one or more processors 70 to enhance contrast by applying histogram equalization to the one or more images and by binarizing, using adaptive thresholding, the one or more images. In yet another instance, the computer readable code is capable of causing the one or more processors 72 applied adaptive techniques in implementing the analysis component 35 and to obtain substantially optimal performance of the adaptive analysis component 35.

In a further instance, in obtaining the substantially optimal performance of the adaptive analysis component 35 or in implementing the detection component, the computer readable code is capable of causing the one or more processors 70 to apply neural network techniques.

In order to better describe the methods and systems of these teachings, the following exemplary embodiment is described herein below. One exemplary embodiment of the methods and systems of these teachings is described hereinbelow in which the body 10 is a human body and the object is concealed under cloth. It should be noted that other embodiments are within the scope of these teachings.

Figure 6:
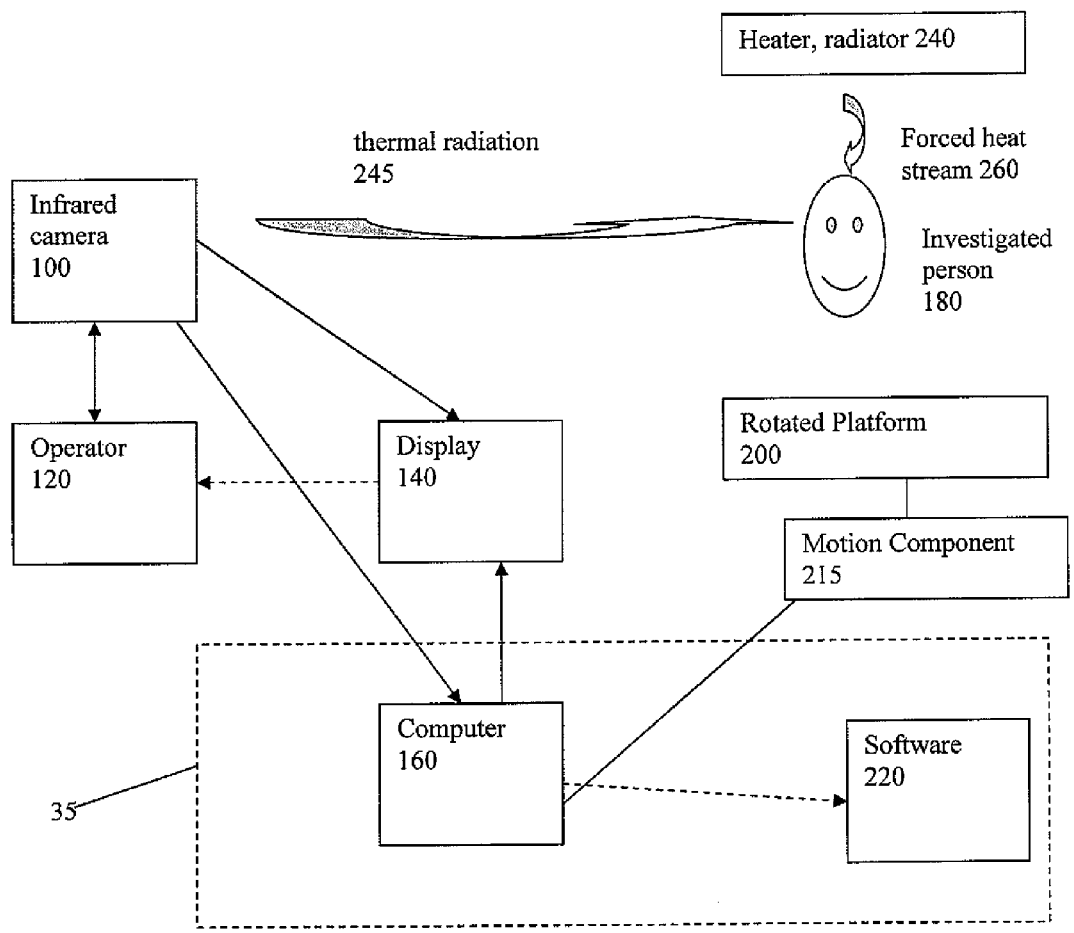
FIG. 6 is a graphical schematic representation of an exemplary embodiment of the system of these teachings.

Referring to FIG. 6, thermal body radiation (heat) 245 emanates from an investigated person 180 and is received by an infrared camera 100. The infrared camera 100 can be stationary, remotely controlled or controlled by operator 120. The infrared Camera 100 generates an image, which is displayed at display 140. In one instance, the operator 120 watching the image is a decision maker about concealed object under cloth of the investigated person 180. The Infrared camera 100 provides an image signal to the computer 160. The image signal is analyzed, by means of computer readable code (software) 220 embodied in a computer usable medium in the computer 160, in order to detect the presence of objects concealed under cloth on the investigated person 180. The computer 160 and the computer readable code 220 represent an embodiment of the analysis component 35, such as the embodiment shown in FIG. 3. In one embodiment, the investigated person 180 is located on a platform 200. A motion component 215 is operatively connected to the platform 200 and capable of causing rotation of the platform 200. The motion component 215 is controlled by means of the Computer 160. The rotation of the platform 200 allows the camera 100 to observe the investigated person 180 from different angles. (In another embodiment, a number of cameras 100 located around the periphery of the location of the person 180 allow observation from different angles. In such an embodiment the platform 200 is replaced by a number of cameras 100 at different positions.) A temperature modifying device 240, a heating device in the embodiment shown, creates a forced heat stream 260 changing the temperature distribution (heating in this embodiment) of the investigated person 180 to create heat misbalance between the objects under cloth and human body temperature.

Figure 7A:
FIGS. 7a-7g are pictorial representations of results from an exemplary embodiment of the system of these teachings.
Figure 7B:
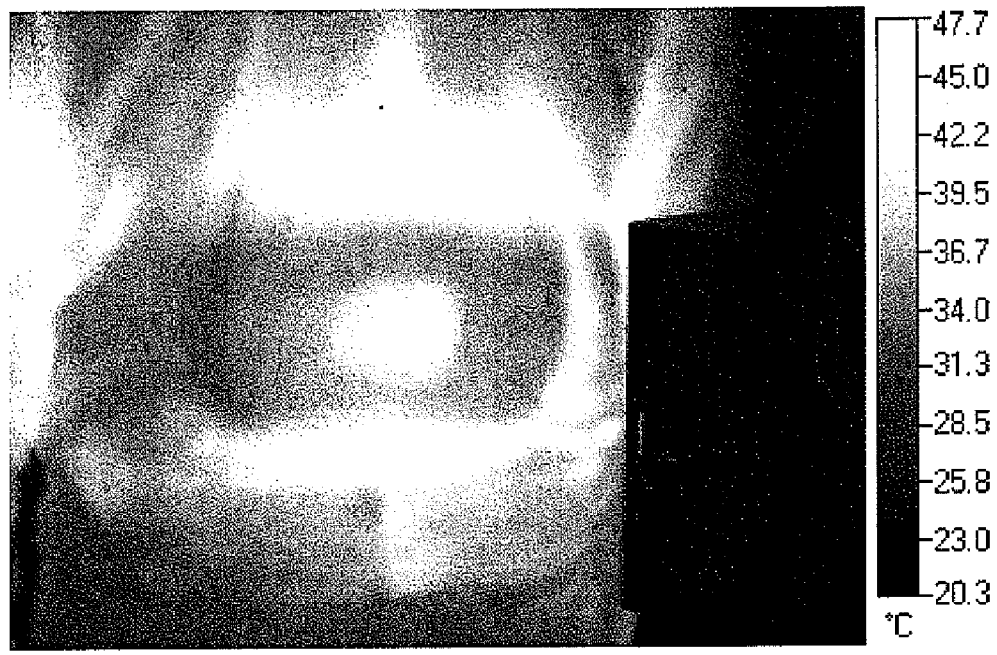
Figure 7C:
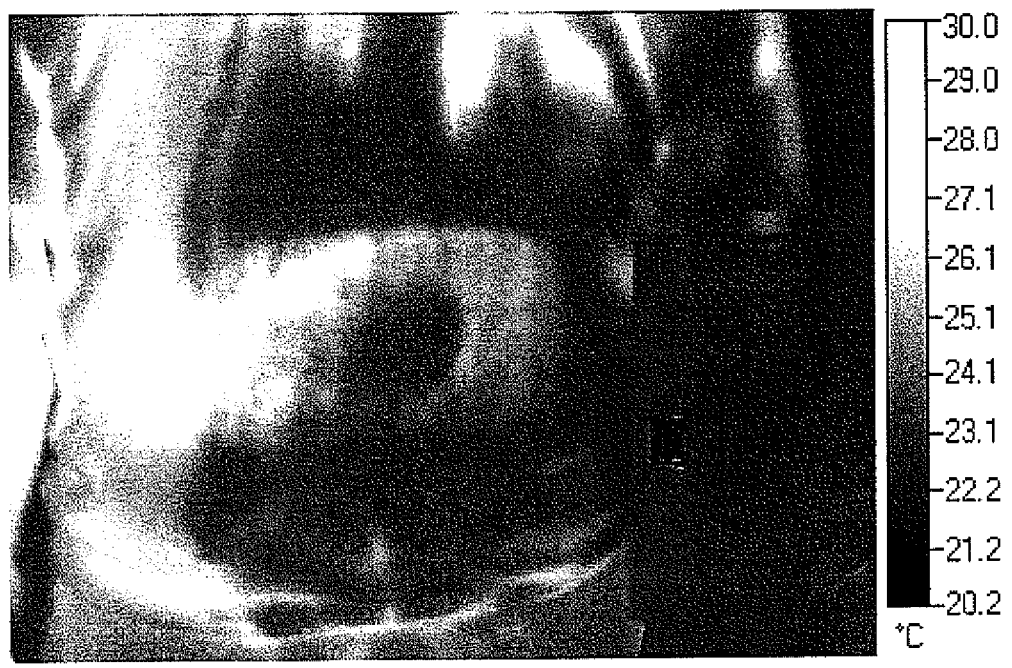
Figure 7D:
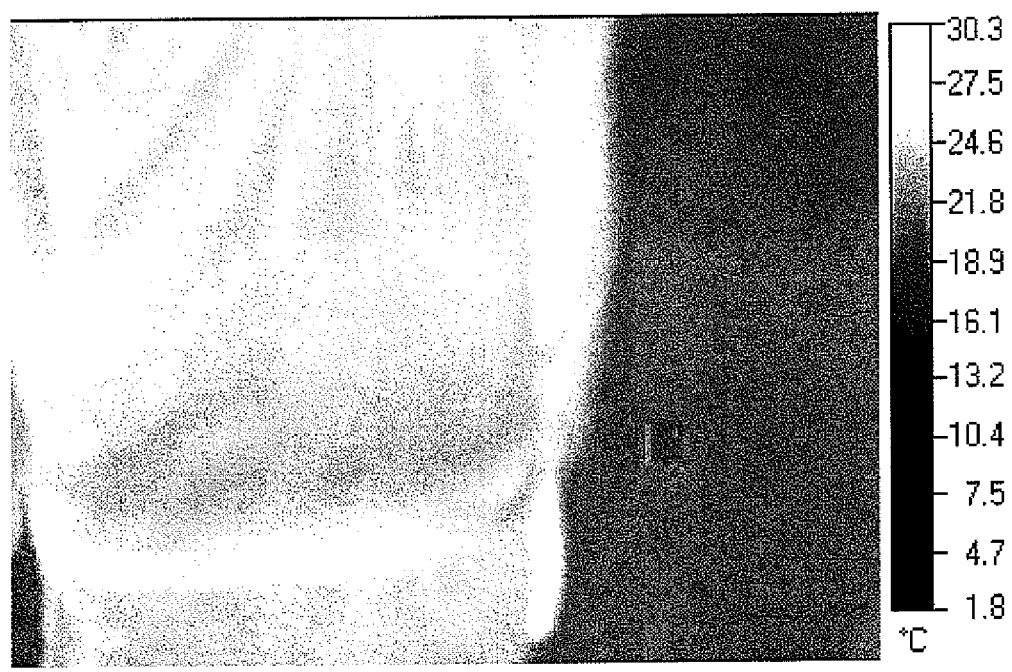
Figure 7E:
Figure 7F:
Figure 7G:

FIGS. 7a-7g show results obtained for the exemplary embodiment of FIG. 6 for different temperature modifying components 240. FIG. 7a shows an image obtained from the camera 100 without any temperature modification. FIG. 7b shows the image obtained after preheating by forced air. FIG. 7c shows the image obtained after preheating and then cooling, both by forced air. FIG. 7d shows another image obtained from the camera 100 without any temperature modification. FIG. 7e shows the image, corresponding to FIG. 7d, obtain after cooling with forced air. FIG. 7f shows yet another image obtained from the camera 100 without any temperature modification in which the object, concealed under a shirt and two sweaters, is almost invisible. FIG. 7g shows an image, obtained from the camera 100, of the same object as in FIG. 7f after the investigated person has been heated by a forced stream 260 from the radiator 240.

Figure 8A:
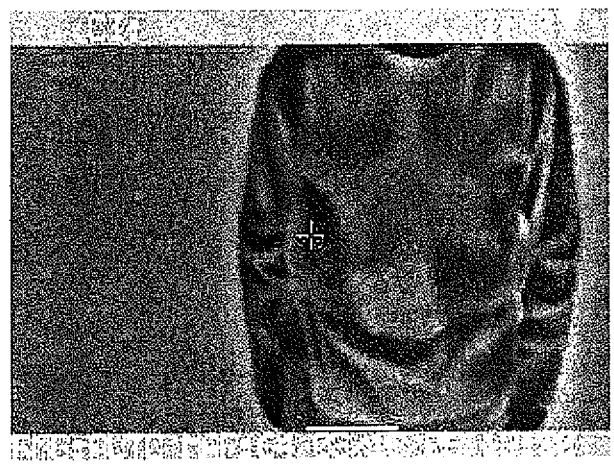
FIGS. 8a-8f are pictorial representations of other results from an exemplary embodiment of the system of these teachings.
Figure 8B:
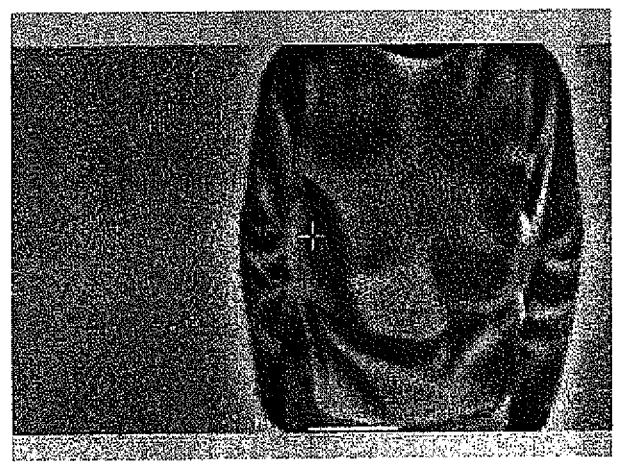
Figure 8C:
Figure 8D:
Figure 8E:
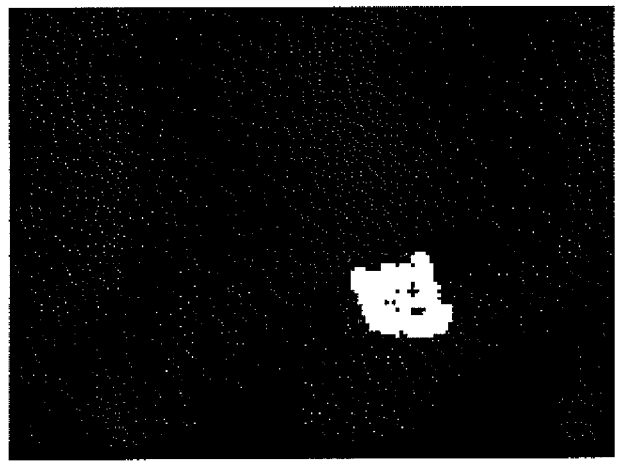
Figure 8F:
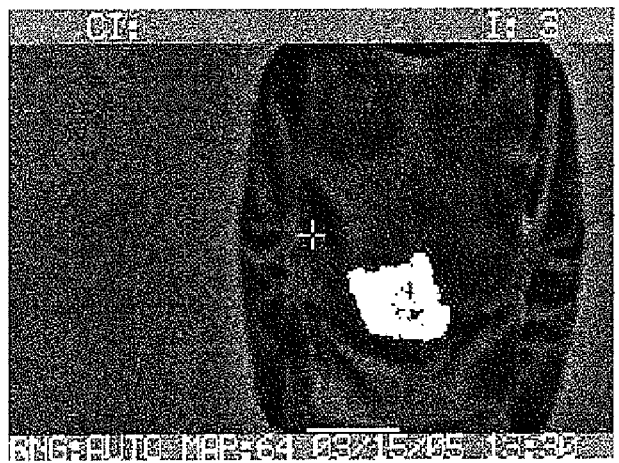

FIGS. 8a-8f show representations of images obtained utilizing the exemplary embodiment of FIG. 6 in which the analysis component 35 is an embodiment as shown in FIG. 3. FIG. 8a shows an image, obtained from camera 100, produced by thermal radiation from the body 180 after temperature modification (preheating). FIG. 8b shows a contrasted image created from the image of FIG. 8a by histogram equalization. FIG. 8c is a Binary image that is the output of the adaptive thresholding component. The binary image of FIG. 8c is downsampled (in order to save processing time of the region detecting component 55) to obtain a downsampled image shown in FIG. 8d. The region detecting component 55, with input (moment invariants) from the region analysis component 50, extracts an image including a given symmetrical region (concealed object), shown in FIG. 8e. An image (upsampled), shown in FIG. 8f, showing the enhanced region (concealed object), is displayed at the display 140.

Figure 9A:
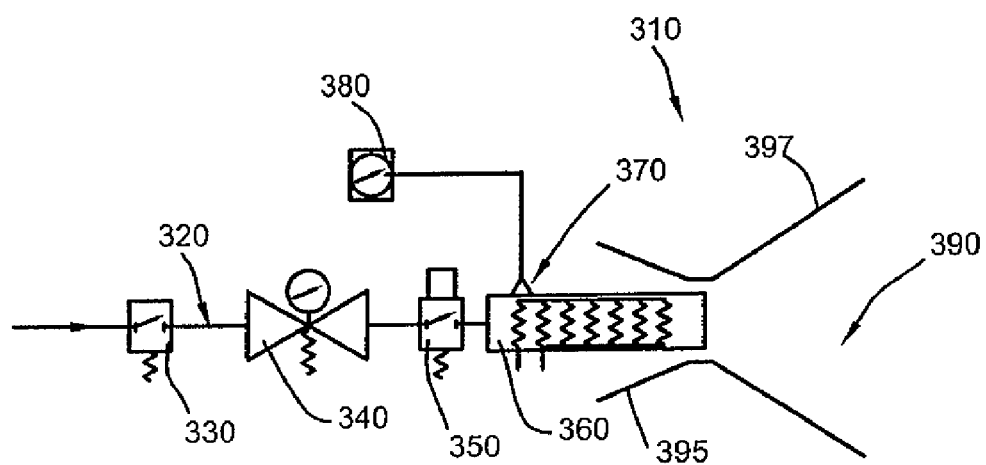
FIG. 9A depicts a schematic drawing of one embodiment of the temperature modifying component of these teachings.

One embodiment of the temperature modifying method and system of these teachings is described hereinbelow. In one embodiment, the method for modifying temperature includes providing a device according to the current invention that provides a controlled gust (a "gust" as used herein refers both to the pulsed stream of heated gas and a continuous stream of heated gas) of heated gas (hereinafter referred to as air). In one embodiment of the temperature modifying system (shown in FIG. 9A), these teachings is not being limited to only this embodiment, the system includes a gust generator 310 comprised of a compressed air line 320 with a pressure switch 330, a pressure regulator 340, and a solenoid valve 350. A heater 360 with a thermocouple 370 and a temperature controller 380 is connected to the line 320 and disposed substantially coaxially in an ejector 390. The ejector 390, in one embodiment, comprises an inductor 395 and diffuser 397. The temperature controller 380 maintains predetermined standby temperature that, corresponding to a construction and thermal mass of the heater 360, sufficient to heat the intermittent pulses of the compressed air to a predetermined temperature. The air released by the valve 350 through the heater 360, draws surrounding air through the inductor 395. Both airflows mix in the diffuser 397 creating single stream with approximately uniform temperature and velocity distribution. Directed appreciably normal to the surface of the clothing covering the body, the resulting gust transfers thermal and kinetic energies that both raises a temperature of the clothing and, by thermal conduction, the underlying body.

Figure 9B:
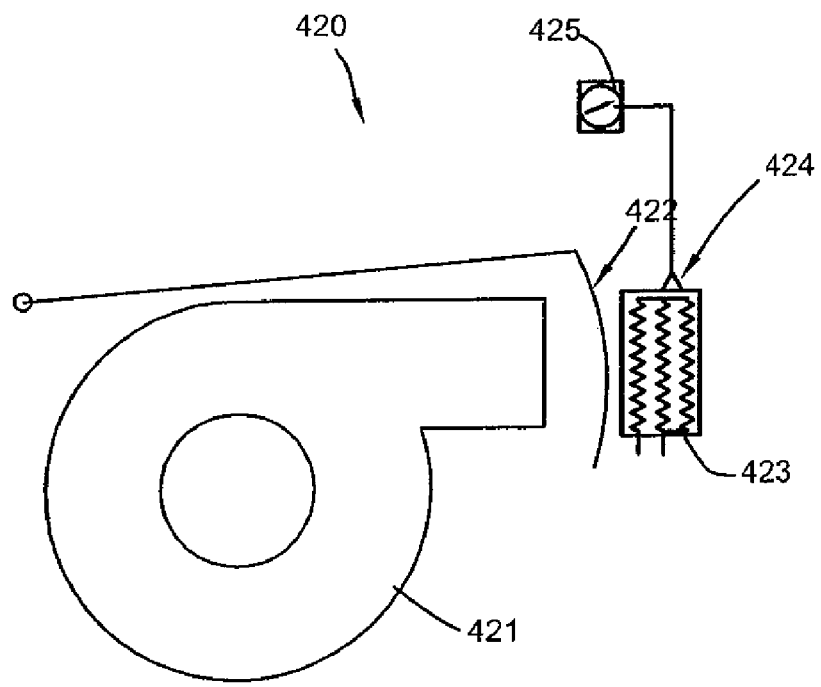
FIG. 9B depicts a schematic drawing of another embodiment of the temperature modifying component of these teachings.

In another embodiment of the temperature modifying system (shown in FIG. 9B), a gust generator 420 comprised of a fan 421 with a deflector 422. A heater 423 with a thermocouple 424 and a temperature controller 425 disposed in downstream of deflector 422. The temperature controller 425 maintains predetermined standby temperature that, corresponding to a construction and thermal mass of the heater 423, ensure heating of gusts of the air from the fan 421 (intermittent gusts, in one embodiment) to a required temperature. Withdrawing the deflector 422 from air path between the fan 421 and the heater 423 opens the airflow through the heater 423 that, directed appreciably normal to the clothes surface, transfers thermal and kinetic energies that both raises a temperature of the clothes and presses them against the underlying body.

Figure 10A:
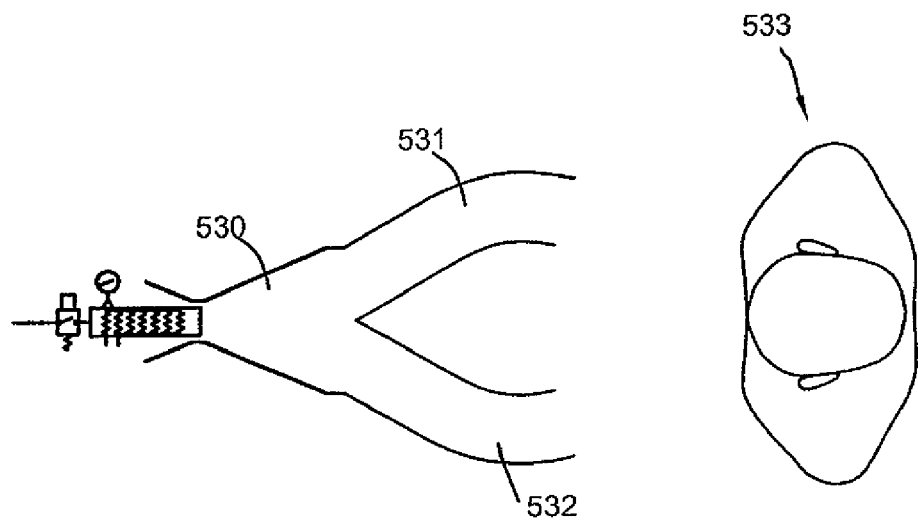
FIG. 10A depicts a schematic drawing of a subcomponent of an embodiment of the temperature modifying component of these teachings.
Figure 10B:
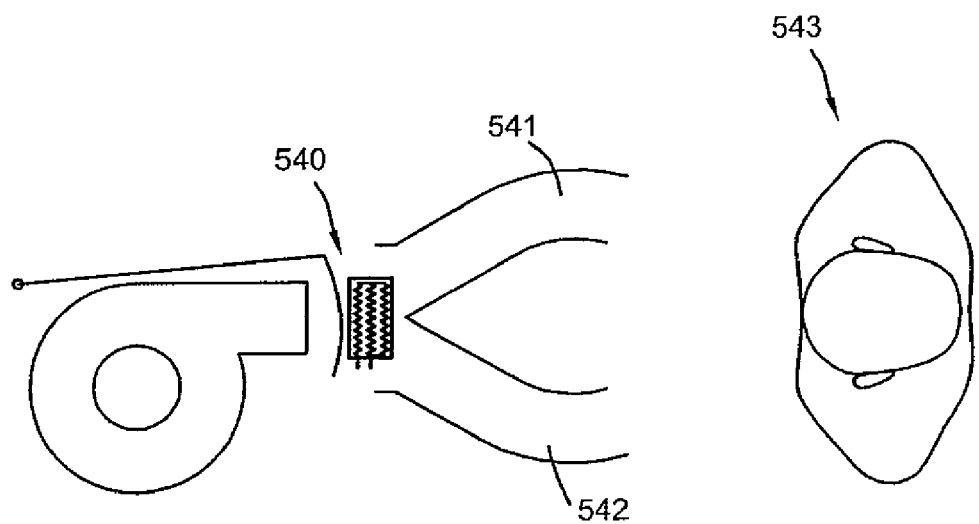
FIG. 10B depicts a schematic drawing of another instance of a subcomponent of an embodiment of the temperature modifying component of these teachings.

In another instance of the temperature modifying system (FIG. 10A and FIG. 10B), the airflow from a gust generator 530/540 is divided by a duct branching in two streams from outlets accordingly 531/541 and 532/542 directed with an account of general shape of the body 533/543 accordingly and a distance from the outlets 531/541 and 532/542 to the body 533/543 surface.

Figure 11:
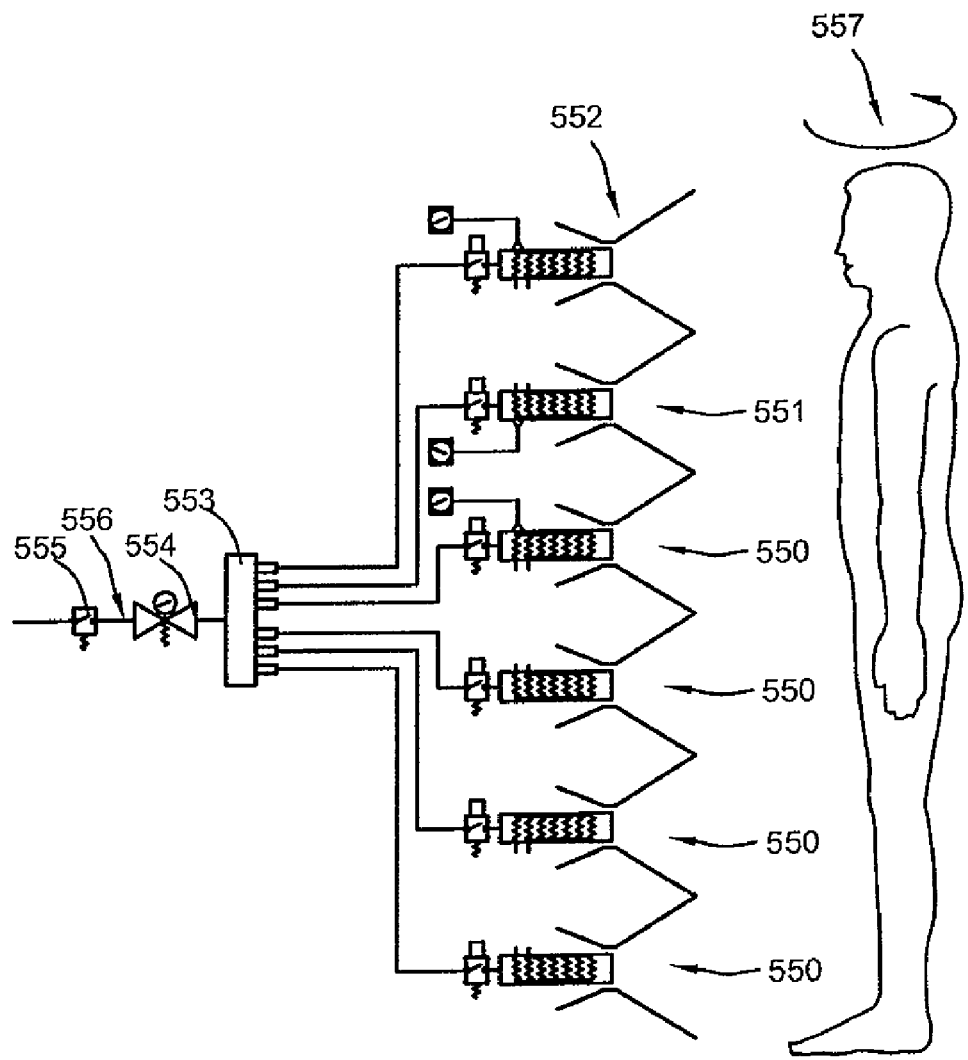
FIG. 11 depicts a schematic representation of a detailed embodiment of the system of these teachings.

In yet another embodiment of the temperature modifying system (shown in FIG. 11), the system includes multiple gust generators arranged in line vertically and divided in three zones controlled separately. The generators 550 form a lower zone that covers height, up to which the body is substantially covered by clothing. Middle and top zones comprise respectively generators 551 and 552. The generators 551 and 552 are activated together with the generators 550 if clothed parts of the body 557 are detected at their corresponding levels. In case shown, generators 550 and 551 would be activated. Automatic detection of the body presence and its height as well as various methods and devices for limiting and directing airflow away from unclothed (or sensitive) body parts are utilized to ensure that the entire body is not exposed to the gust and that the temperature of only a portion of the entire body is modified. (In one instance, the portion of the body receiving the gust of heated fluid is substantially that portion of the body cover by clothing. Sensing techniques include, but not limited to, photodetecting methods, image sensing/ machine vision methods, ultrasound methods, capacitive methods and others. Sensing components (not shown) are located at appropriate position (s) in order to allow detection of the body presence, height or/and discriminate between clothed and unclothed sections of the body.) The gust generators 550, 551, and 552 are connected by a manifold 553 to the common fluid (air) line 556 with pressure regulator 554 and pressure switch 555. This arrangement requires just one temperature controller with the corresponding sensor per zone. In some instances, multiple gusts are applied to the body 557 that cover entire clothed body surface, while the body is being rotated.

Figure 12:
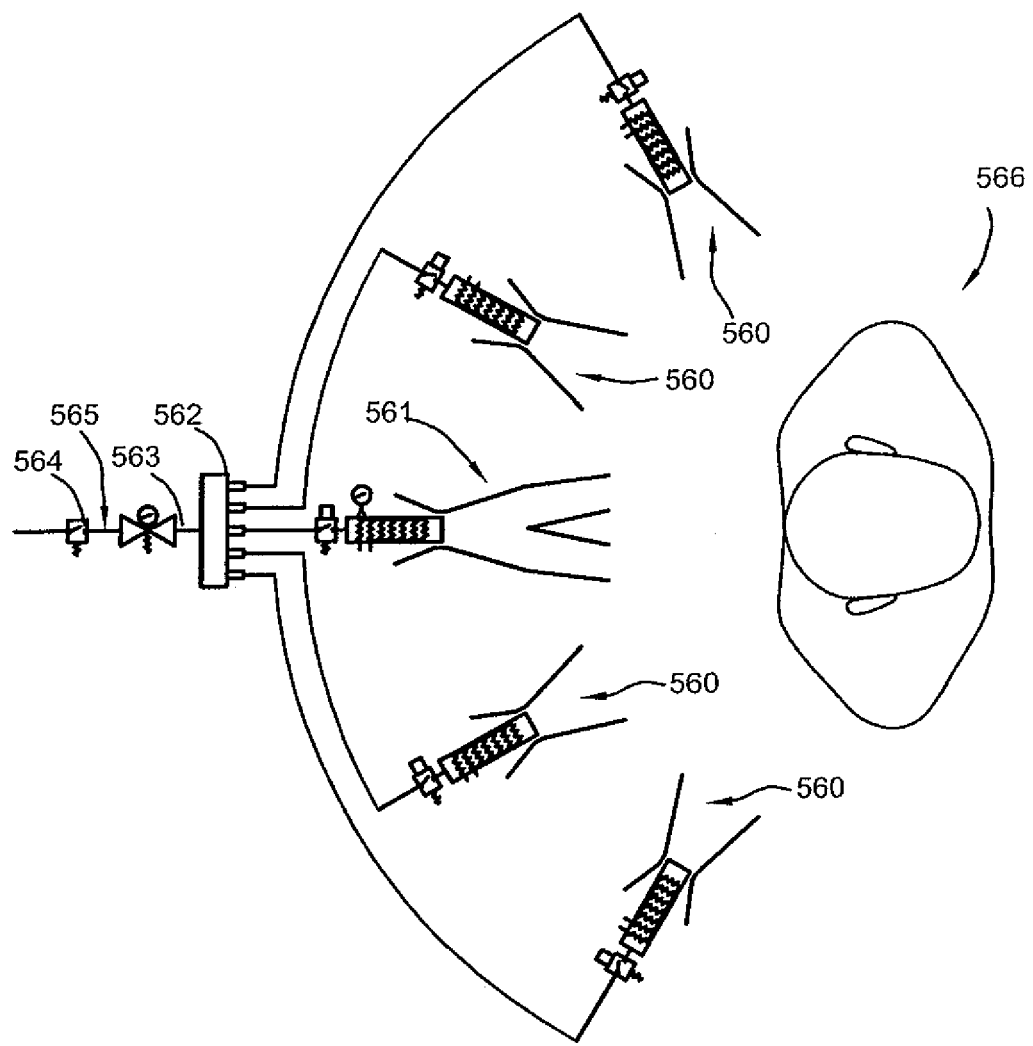
FIG. 12 depicts a schematic representation of another detail embodiment of the system of these teachings.

In another embodiment (FIG. 12), the device comprises multiple gust generators 560 and 561 arranged approximately radially in relation to the body 566. The gust generator 561 is branched so the airflow from it directed to inner leg surfaces. The gust generators 560 and 561 connected by a manifold 562 to the common air line 565 with pressure regulator 563 and pressure switch 564. This arrangement requires just one temperature controller with the corresponding sensor. The device travels vertically while the gust is applied that provides for a half body scan.

In yet another embodiment (FIG. 13), an exemplary embodiment of a vertical transport mechanism capable of enabling vertical displacement of one or more temperature modifying components, the device comprises the gust generator 570 attached to a carriage 571 (an exemplary embodiment of a supporting member) that also holds an infrared camera 572 (in the embodiment shown, although it should be noted that embodiments in which infrared cameras or other image acquisition devices are stationary are also within the scope of these teachings) and placed slideably on a vertical slide 573 (an exemplary embodiment of a substantially vertical structural member), which affixed to a horizontal member 576 that rotatably connected to a frame 577 (it should be noted that embodiments in which the vertical transport mechanism is stationary are also within the scope of these teachings). A counterweight 575 placed slideably on a vertical slide 574 that affixed to the member 576 opposite to the slide 73. (Embodiments in which the counterweight includes another gust generator are also within the scope of these teachings. See Figure) Generally the carriage 571 and the counterweight 575 are linked a mechanism (two sheaves and are substantially fixed length connector, one of which is attached to the carriage 571 and the other end attached to the counterweight to 575, the connector adapted to run on both sheaves) that balances both the carriage 571 and the member 576, an exemplary embodiment of a transport component. The body 578 is positioned approximately at rotational axis of the member 576. The carriage 571 with the generator 570 and the camera 572 scans the body 578 in, for example, a spiral pattern. (Sensing components (not shown) are located at appropriate position (s) in order to allow detection of the body presence, height or/and discriminate between clothed and unclothed sections of the body and provide information to a temperature modifying system controller.)

The temperature modifying method, in one embodiment, also includes positioning the body at predetermined location (or determining parameters and characteristics of the body) so, that airflow from the gust generator(s) would be directed appreciably normal (perpendicular) to the surface of the clothes (and would not be directed to unclothed portions of the body so that the entire body is not subjected to the airflow). (In other instances, the flow is guided at the emitting body in a predetermined direction.) In this embodiment, data of body parameters is sensed by sensors (not shown) (such as, but not limited to, photodetectors, ultrasound sensors and other location or distance sensors) and is transmitted to a gust generator controller.

The temperature modifying method, in one embodiment, also includes applying the gust of heated air to the surface of the clothes resulting in the transmission of thermal and kinetic energies that raises a temperature of the clothes and, by thermal conduction and by pressing the clothing against the body, of the underlying body. Depending on the embodiment of the device used, the application differs in duration and may differ in the air temperature. Commonly for most of the embodiments, according to present invention, the gust controller takes control of the heaters from the temperature controller after the body positioned and turns on full power to the heaters. After a predetermined time delay, a gust is generated that produces a pulse of the heated air. At the end of the gust the gust controller turns the heater control back to the temperature controller. This counteracts thermal inertia of the heaters that leads to both decreasing energy consumption and decreasing size of the heaters.

As described herein above, in one embodiment, the method of these teachings also includes capturing the infrared radiation from the clothed body (an object covered by one or more garments) on camera. In one instance, object visibility initially increases. In one instance, object visibility begin to diminish after about 1 to about 3 minutes.

In the embodiment in which the gust is a pulsed stream of heated air, the temperature of the pulse is selected to be sufficient to increase the temperature of the clothing that cover in the body (and of the body) by about 20 to about 40 degrees C., producing temperatures of the clothing that cover in the body (and of the body), when the body is located about 30 cm away from the gust generator, of about 45 to about 60 C. In one embodiment, the velocity of the air stream at the body is about 800 to 1100 feet per minute. In another embodiment, the velocity of the air stream at the body is about 800 to 2400 feet per minute (from about 4 to about 12.3 m/sec). In one instance, the distance between the temperature modifying system and the body is about 30 cm to about 1 m.

In the embodiment in which the gust of heated air is a substantially continuous stream of heated air or a pulse of heated air of a substantially long-duration, the air stream can be directed substantially perpendicular to the body and can be distributed substantially homogeneously along the body in any direction. In one instance, the air stream can be directed (in a predetermined direction) at the emitting body by means of guiding components, such as, but not limited to, slats or louvers. (The slats or louvers being placed to obtain the predetermined direction.) In one embodiment, the temperature of the stream is selected to be sufficient to increase the temperature of the clothing that cover in the body (and of the body) by about 20 to about 40 degrees C., producing temperatures of the clothing that cover in the body (and of the body), when the body is located about 30 cm away from the gust generator, of about 45 to about 60 C. In one embodiment, the velocity of the air stream at the body is about 800 to 1100 feet per minute. In another embodiment, the velocity of the air stream at the body is about 800 to 2400 feet per minute (from about 4 to about 12.3 m/sec). In one instance, the distance between the temperature modifying system and the body can be about 30 to about 50 cm.

Figure 13:
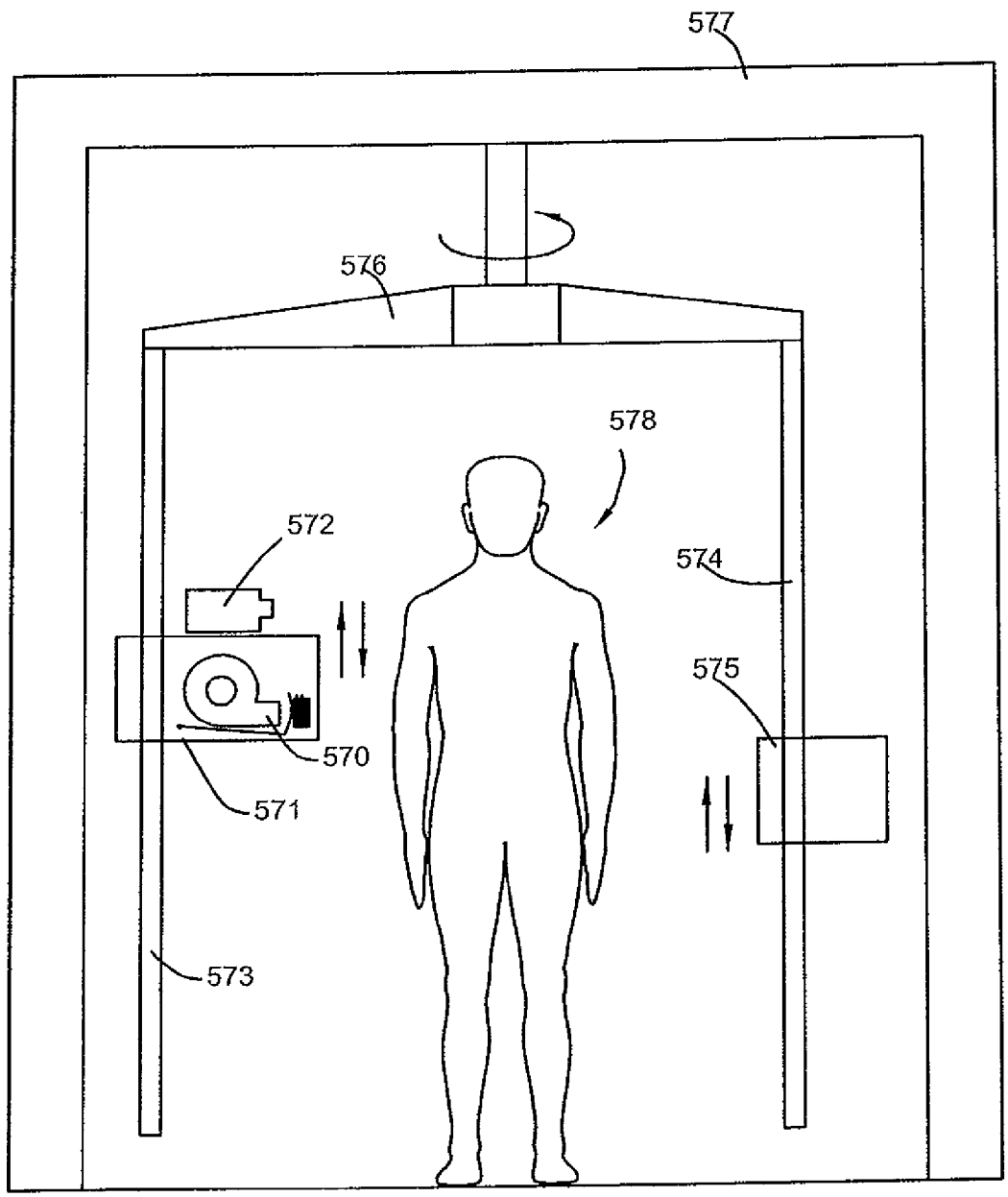
FIG. 13 depicts a schematic representation of embodiment of the scanning device according to present teachings.

It should be noted that embodiments in which the substantially vertical structural member 574 of FIG. 13 and a counterweight 575 of FIG. 13 are located to the left of the other vertical member 573 in FIG. 13 and in which the vertical transport is stationary and means are provided for rotating the emitting body 578 (FIG. 13) are also within the scope of these teachings. One exemplary embodiment shown in FIG. 14, where the vertical members are housed in an enclosure 580.

In embodiments in which the emitting body is partially covered by one or more garments, the system of these teachings can also include a component capable of reducing the thickness of a fluid layer between a portion of one or more of the garments and the portion of the emitting body covered by that portion of the one or more garments. (Thickness of the fluid layer, as used herein, is determined in a direction substantially perpendicular to the emitting body.) The fluid (such as, but not limited to, air) between the garments and the emitting body can decrease the contrast of the acquired image, which can be detrimental to recognizing concealed objects.

In one instance, the component capable of reducing the thickness of a fluid layer between a portion of one or more of the garments and the portion of the emitting body covered by that portion of the one or more garments includes a material (in one embodiment a flexible material) capable of substantially conforming to the one or more portions of the garments and to the one or more portions of the emitting body covered by the one or more portions of the garments. Exemplary embodiments of the material include, but not limited to, cloth, a net or mesh or a combination of cloth and net or mesh (referred to as an intermeshed material). In the above instance, the component may also include a subcomponent capable of positioning the material in contact with the garments and the emitting body. (Embodiments in which the emitting body is placed in contact with the material are also within the scope of these teachings.) Such a subcomponent can be, but is not limited to, a mechanical device including a holder for an area of the material, a displacement component for moving the material from one position in which it is away from the garments and the emitting body to another position where it is substantially in contact with one or more portions of the garments in the emitting body (exemplary embodiments of displacement components include mobile linkages, slides and other mechanical transport components) and displacement means (such as, but not limited to, motors, x-y displacement systems, etc.).

Figure 15:
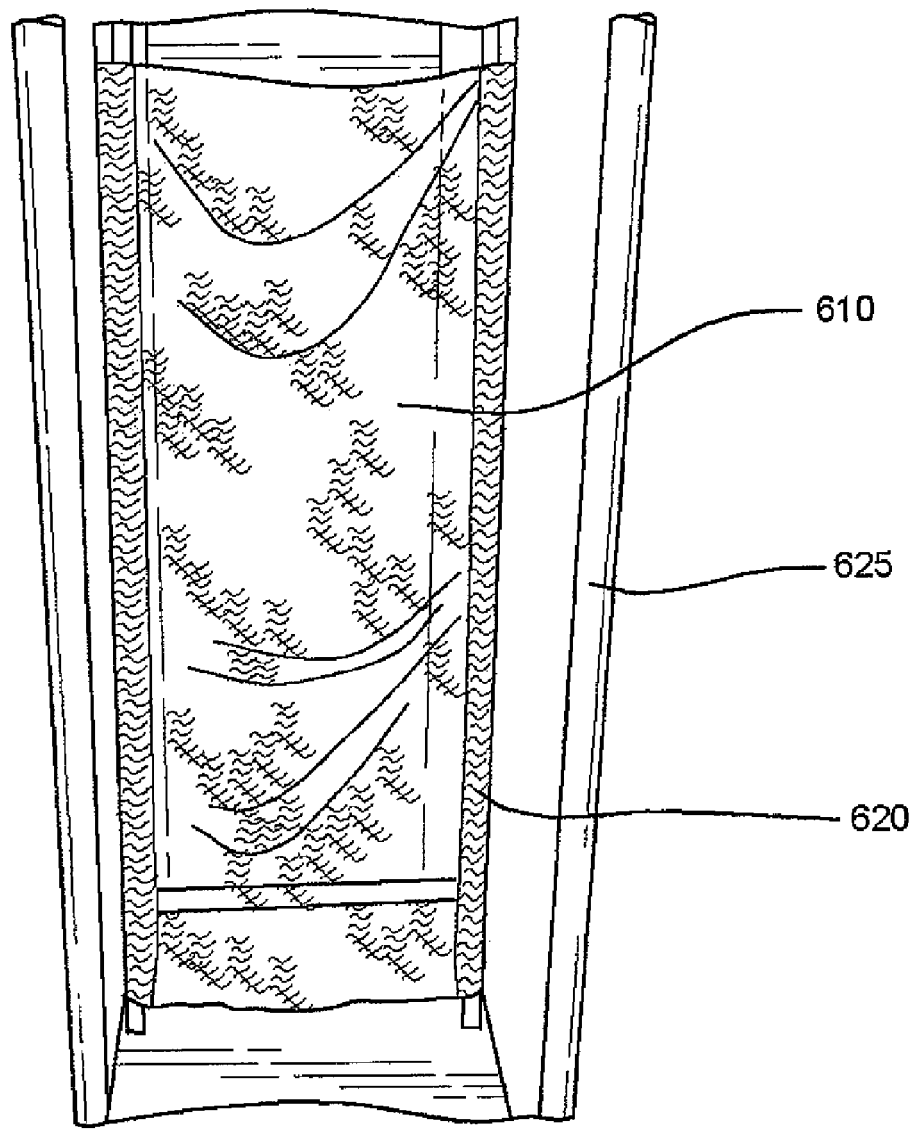
FIG. 15 depicts one embodiment of the component for reducing the thickness of the air layer according to these teachings.

FIG. 15 shows an exemplary embodiment of an intermeshed material 610 mounted on a holding assembly 620 and portions of a displacement component 625.

Figure 16A:
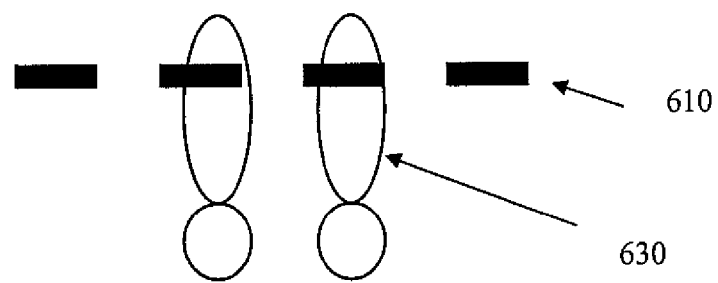
FIGS. 16a-16c depict views of embodiments of the component for reducing the thickness of the air layer according to these teachings.

FIG. 16a shows a cross-sectional view of the intermeshed material 610 being displaced towards the emitting body (and the footprints 630 of the lower part of the emitting body— their footprints being wider than the emitting body to indicate a base or a foot). Although in the embodiment shown in FIG. 16a the intermeshed material 610 is being displayed directly in the direction of the emitting body, other embodiments also possible.

Figure 16B:
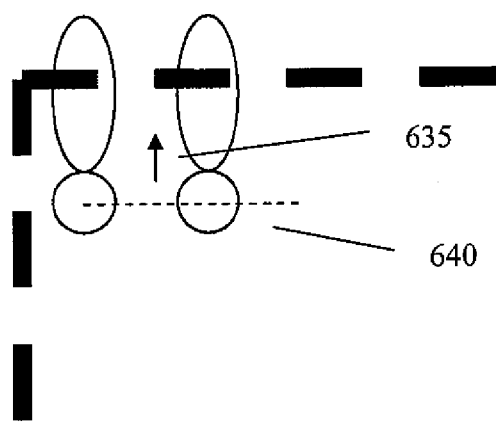
Figure 16C:
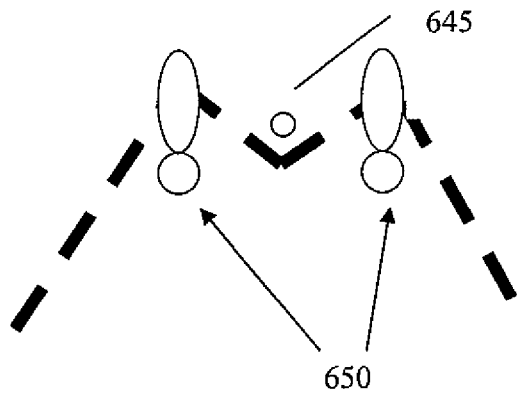

FIG. 16b shows an embodiment in which the intermeshed material is being displaced at an angle (approximately 45° in the embodiment shown) with respect to a normal 635 to a mid-plane 640 of the body. In this embodiment, the intermeshed material can substantially conform to the front and the side of the garment and emitting body and can substantially reduce the depth of the air layer between the garment and the emitting body in both the front and the side of the emitting body. FIG. 16c shows another embodiment in with the intermeshed material forms a W-like shape by having one support 645 located at a position between the two supports 650 of the emitting body. In the embodiment shown in FIG. 16c, the holding assembly 620 also includes the support 645 located such that, as the intermeshed material becomes contiguous with the garment and the emitting body, the support 645 is located in a position between the two supports 650 of the emitting body.

Figure 17:
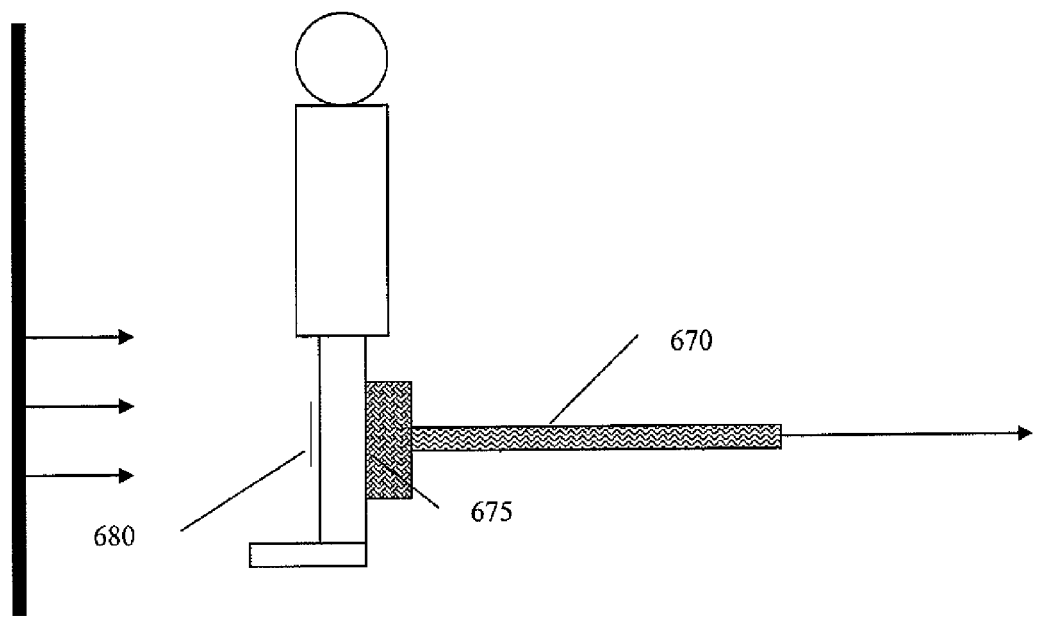
FIG. 17 depicts another embodiment of the component for reducing the thickness of the air layer according to these teachings.

In another instance, the component capable of reducing the thickness of a fluid layer between a portion of one or more of the garments and the portion of the emitting body covered by that portion of the one or more garments includes a suction component capable of exerting suction on the garment and one or more locations. The exerted suction causes the garment to substantially conform to one or more other portions of the emitting body at a region including at least one more locations substantially opposite to the location at which the suction is applied. FIG. 17 shows an embodiment of the system of these teachings in which a vacuum suction component 670 is applied to a portion of a garment covered emitting body 675 causing the garment to substantially conform to the body in a region 680 substantially centered at about a location 685 substantially opposite to the location at which the suction is applied.

Figure 14:
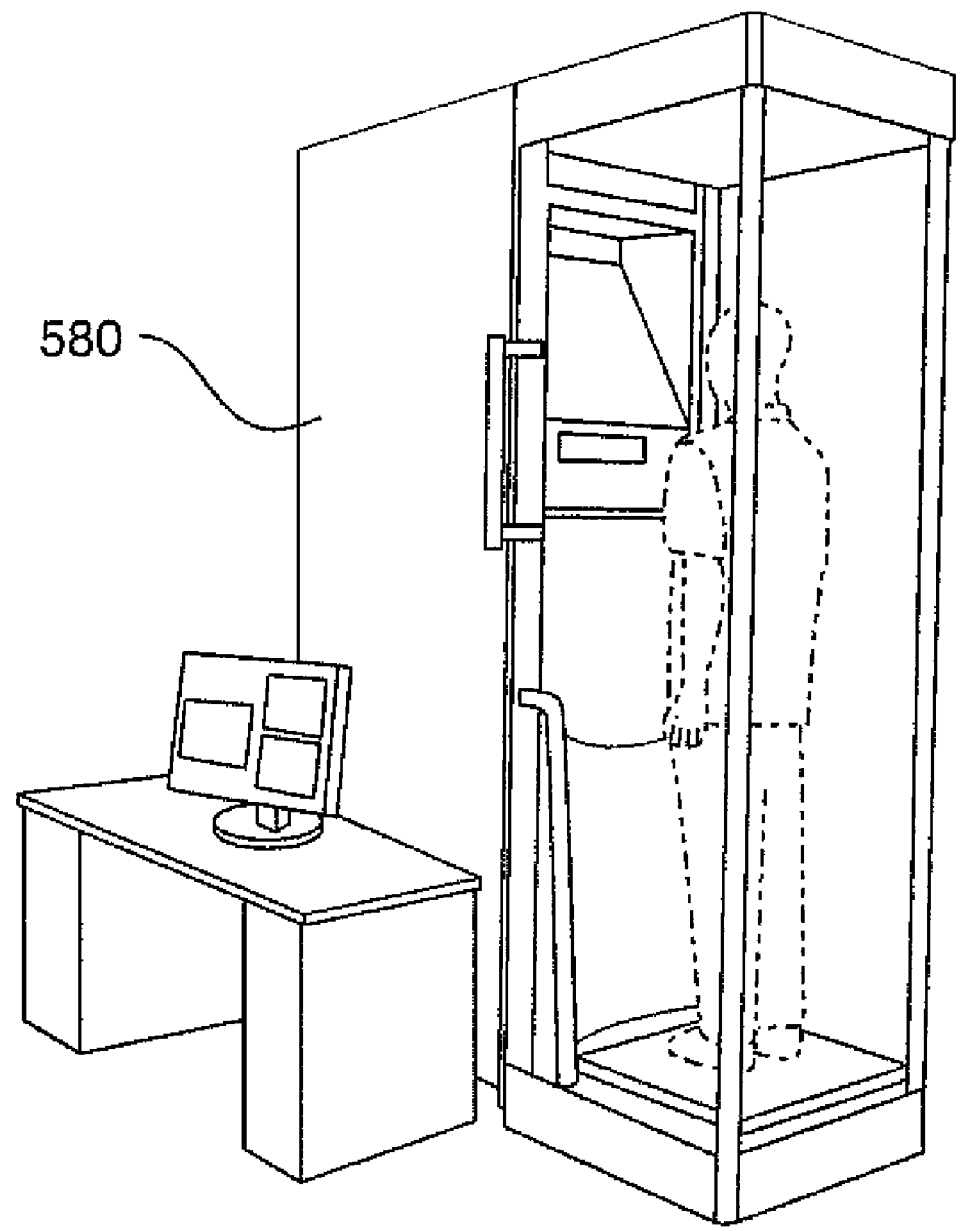
FIG. 14 depicts a schematic representation of another embodiment of the system of these teachings.
Figure 18:
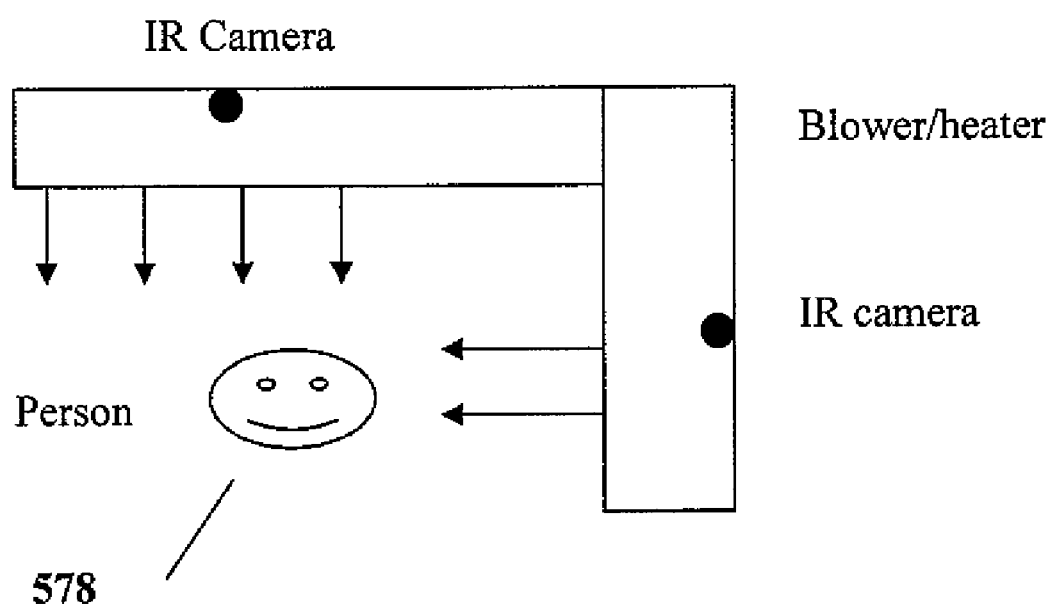
FIG. 18 depicts a schematic representation of yet another embodiment of the system of these teachings.
Figure 19:
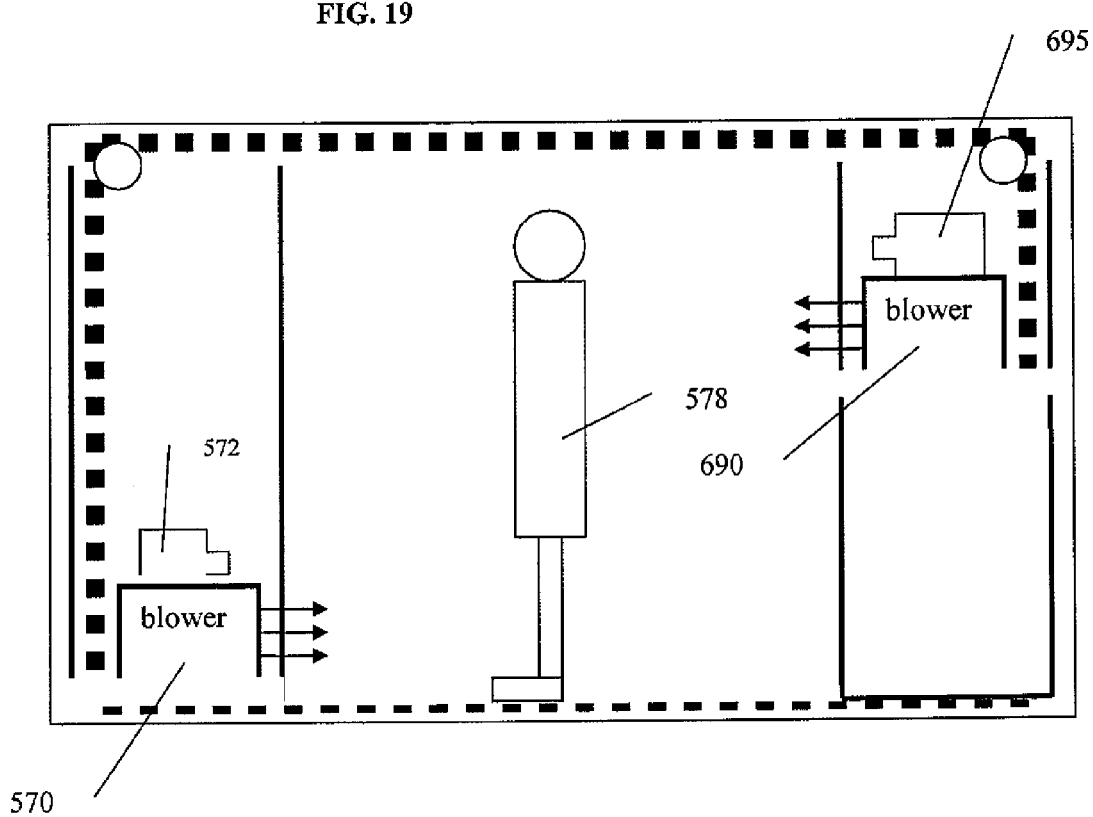
FIG. 19 depicts a schematic representation of a further embodiment of the system of these teachings.

Although the embodiments of the system with these teachings shown in FIGS. 13 and 14 include one temperature modifying component and one camera being substantially vertically transported, other embodiments are within the scope of these teachings. FIG. 18 shows an embodiment of the system of these teachings with two temperature modifying components and cameras capable of obtaining an image of the front and on one side of an emitting body. In the embodiment shown in FIG. 18, the emitting body only needed to rotate once by substantially 180° in order to obtain a substantially complete image. Another embodiment is shown in FIG. 19. In the embodiment shown in FIG. 19, the counterweight 575 of FIG. 13 is replaced by another temperature modifying component 690 (gust generator) and another image acquisition device (camera) 695.

It should be noted that embodiments in which parameters of interest, such as, but not limited to, the temperature at the exit of the temperature modifying component, the displacement speed of the carriage 571, the operation of the component for reducing the thickness of the fluid layer (whether a material or a suction device) and interaction between the sensing components capable of sensing body presence and the temperature modifying component, can be controlled by a controller components such as a PLC or a computer are within the scope of these teachings.

Figure 20:
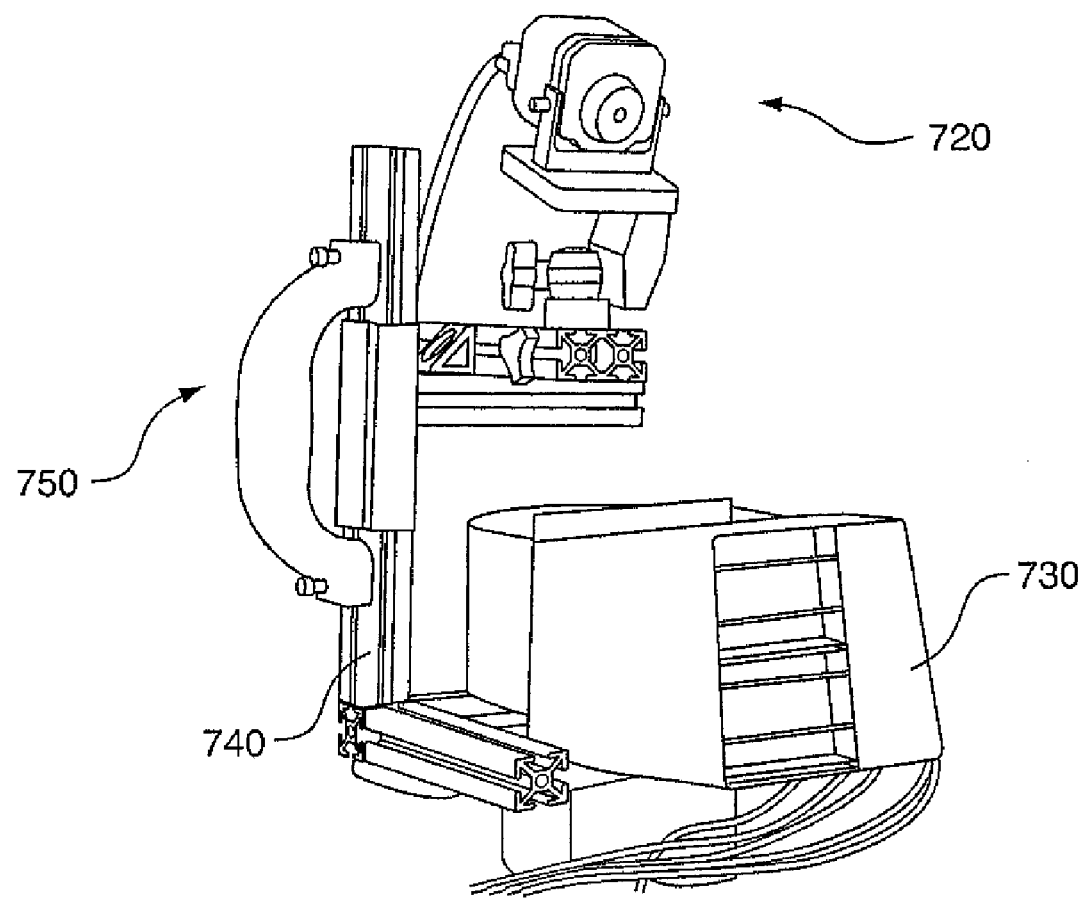
FIG. 20 depicts a pictorial representation of a portable embodiment of the system of these teachings.

A portable embodiment of the system of these teachings is shown in FIG. 20. Referring to FIG. 20, the embodiment shown there in includes a temperature modifying component 730 (in one embodiment, a blower with a manifold and a heater at the output) and an infrared camera 720. The temperature modifying component 730 and the camera 720 are attached to a frame 740. In the embodiment shown the camera is disposed above the temperature modifying component (other embodiments are within the scope of these teachings). The embodiment shown in FIG. 20 is configured such that the embodiment is portable and includes a handle 750 attached to the frame 740; the embodiment being capable of being handheld.

Figure 21:
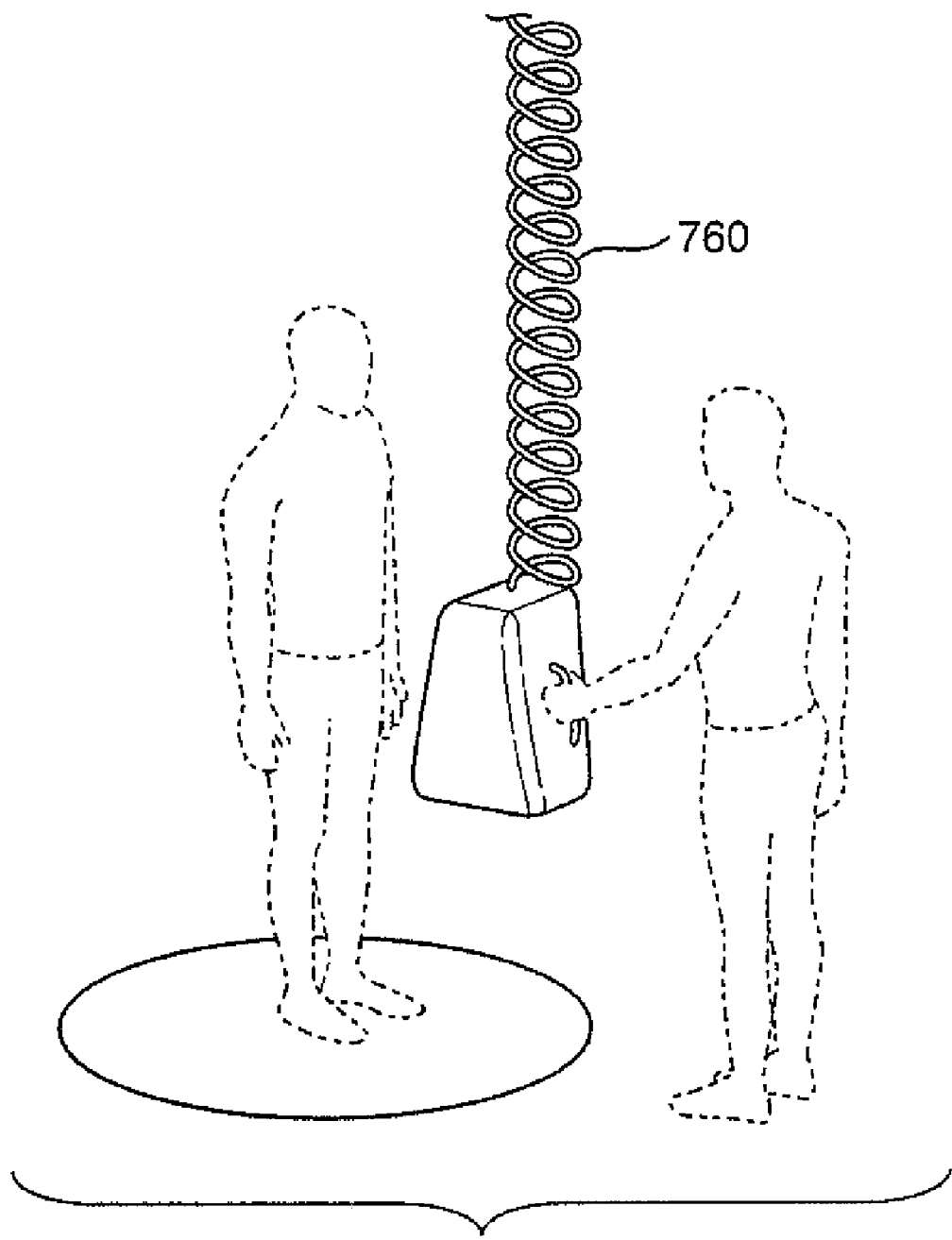
FIG. 21 depicts a pictorial representation of another portable embodiment of the system of these teachings.
Figure 22:
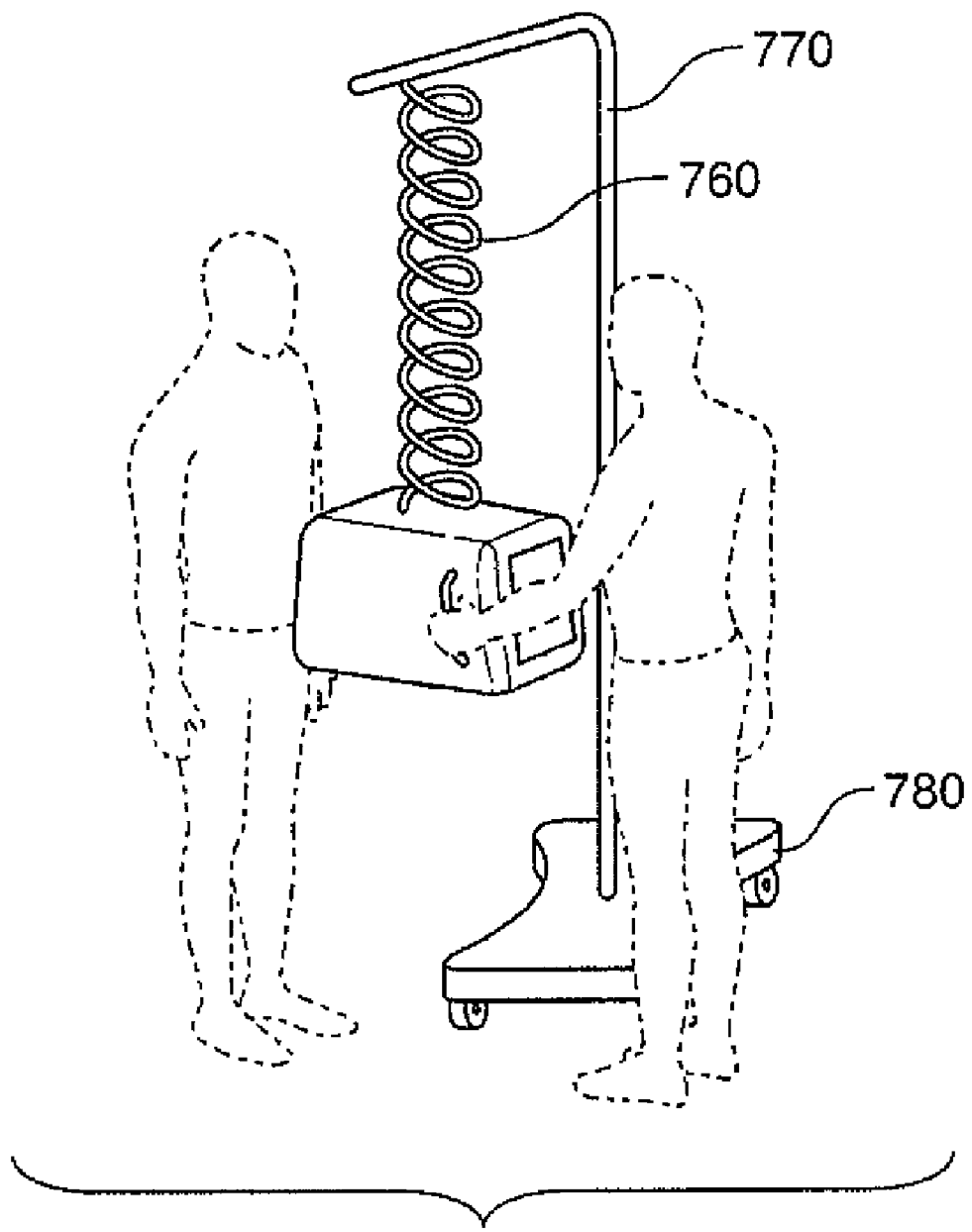
FIG. 22 represents a pictorial representation of yet another portable embodiment of the system of these teachings.

Other portable embodiments are shown in FIGS. 21-26. Referring to FIG. 21, in the embodiment shown therein, the frame (or an enclosure including or enclosing the frame) is attached by means of a slidable connector, such as a spring, 760 (other attachment components being possible) to the ceiling or to an upper frame. In the embodiment shown in FIG. 22, a supporting structure 770 is provided. The supporting structure has a vertical component and a horizontal component attached to an upper end of the vertical component. The lower end of the vertical component is attached to a movable components 780 such as a movable platform. The first frame (or an enclosure including or enclosing the first frame) is attached by means of a slidable connector, such as a spring, 760 (other attachment components being possible) to the horizontal component.

Figure 23:
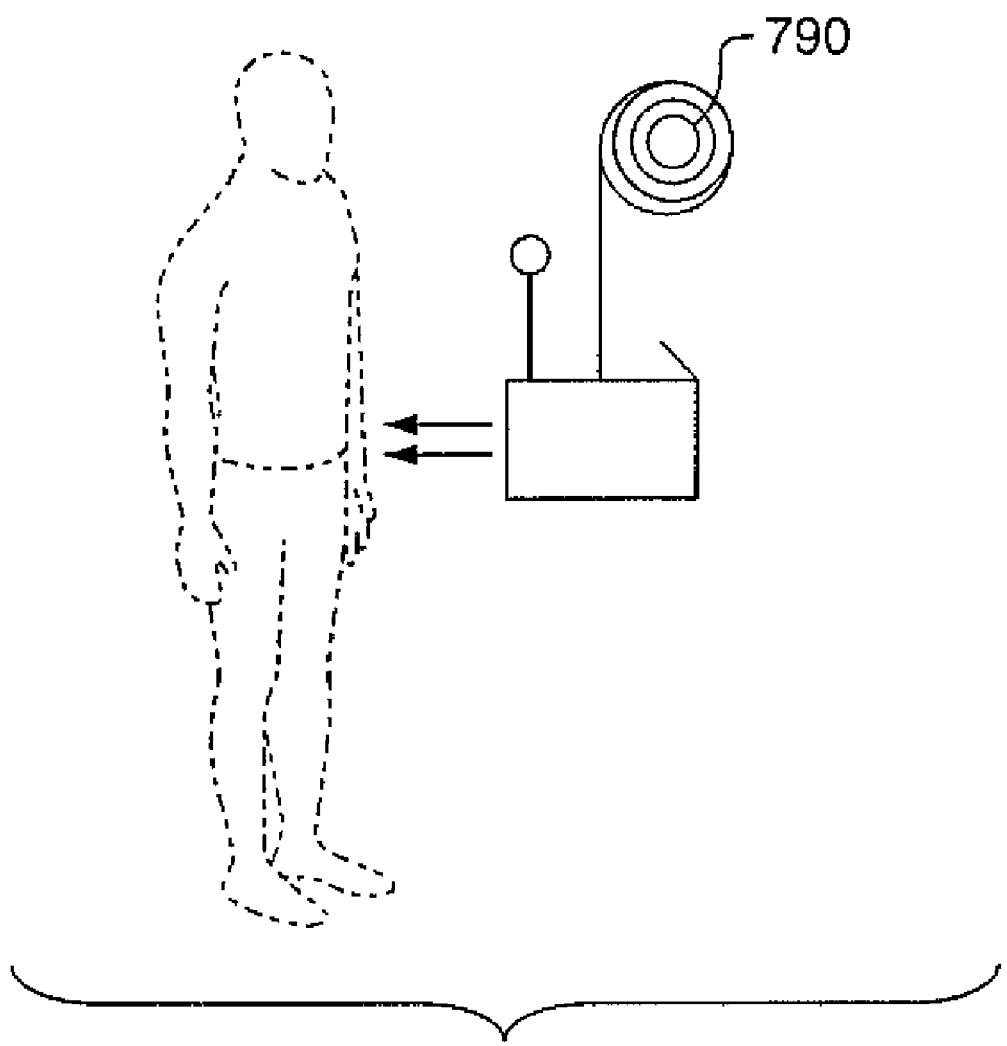
FIG. 23 represents a pictorial representation of a further portable embodiment of the system of these teachings.

In the embodiment shown in FIG. 23, the horizontal component is replaced by a spiral spring support 790 and the first frame (or an enclosure including or enclosing the frame) is attached by attachment means (several attachment components being possible) to the spiral spring support.

Figure 24:
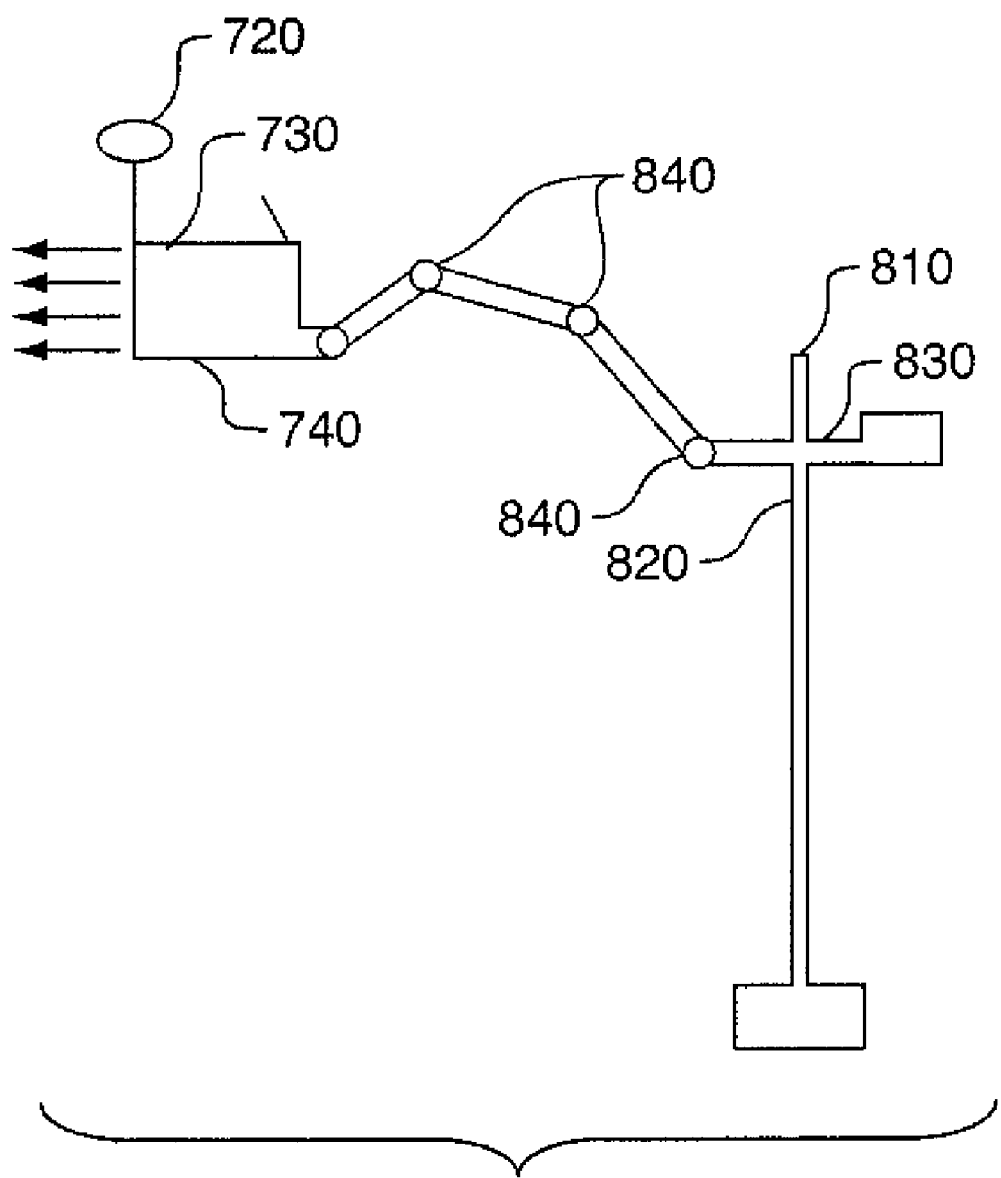
FIG. 24 represents a pictorial representation of yet a further portable embodiment of the system of these teachings.

Referring to FIG. 24, the first frame 740, to which the temperature modifying component 730 and the camera 720 are attached to a support structure 810. The support structure 810 has a vertical support component 820, the horizontal support component 830, and a number of elements (components) 840 attached to each other and to the horizontal support component by means of a movable connection, such as a joint. The first frame 740 is attached by a least one of a number of elements 840 connected to each other by means of movable connections (joints in one instance).

In the embodiments shown in FIGS. 20-24, the first frame, to which the temperature modifying component and the camera are attached, is movable by hand and can be considered handheld. The weight and dimensions of the frame with the temperature modifying component and a camera attached are selected to enable the resulting system to be portable. In one instance, the weight of the system is at most 35 pounds and the height of the system is less than 1 m.

Figure 25:
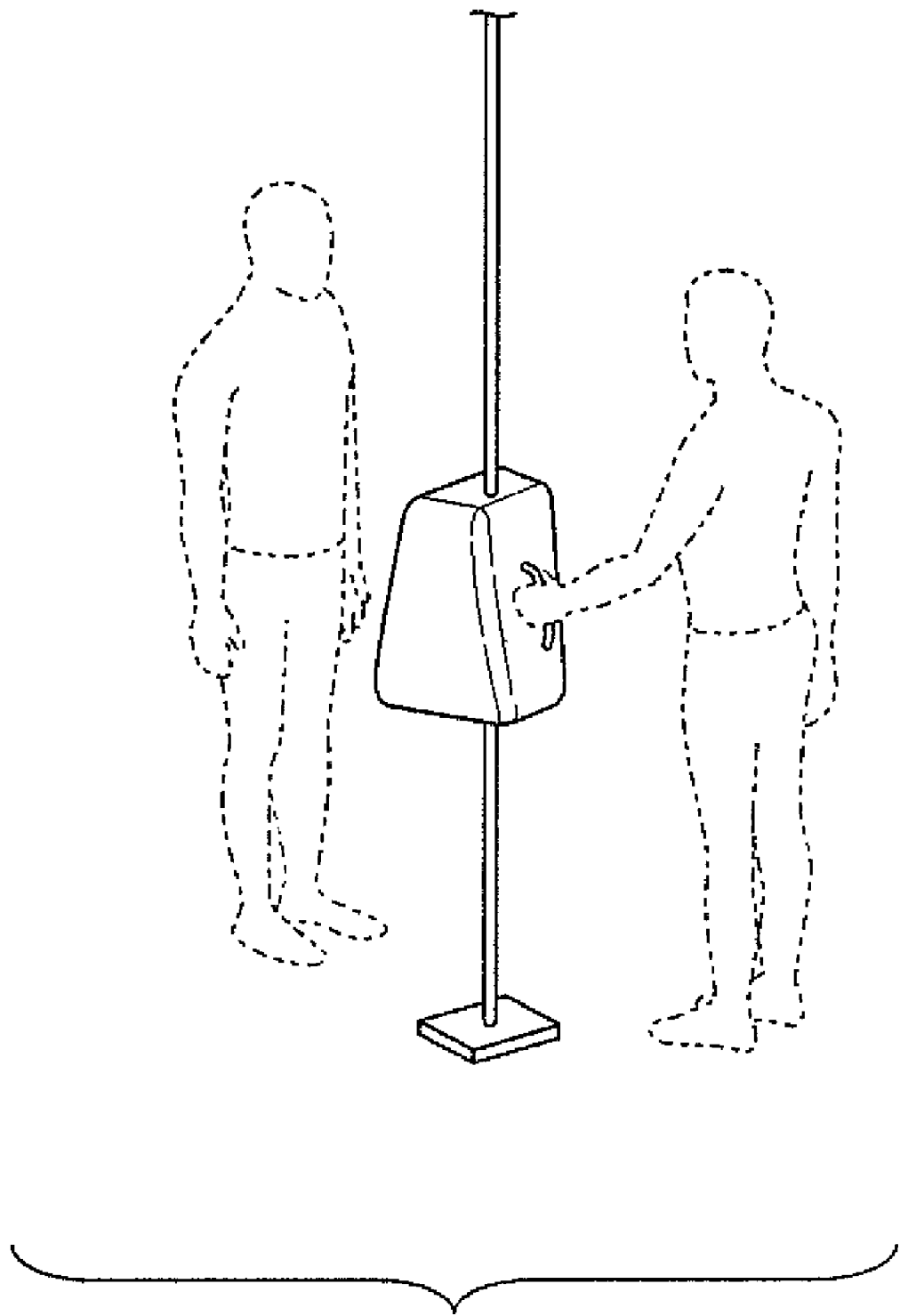
FIG. 25 represents a pictorial representation of still another portable embodiment of the system of these teachings.

Referring to FIG. 25, in the embodiment shown therein the first frame (or an enclosure including or enclosing the frame) is attached to a vertical element and the lower end of the vertical element is attached to a movable platform. The movable platform can be located and operatively connected to a guiding structure (such as rails). In one instance, the system is rotated by an operator and can be rotated around a subject by moving along the special rails.

Figure 26:
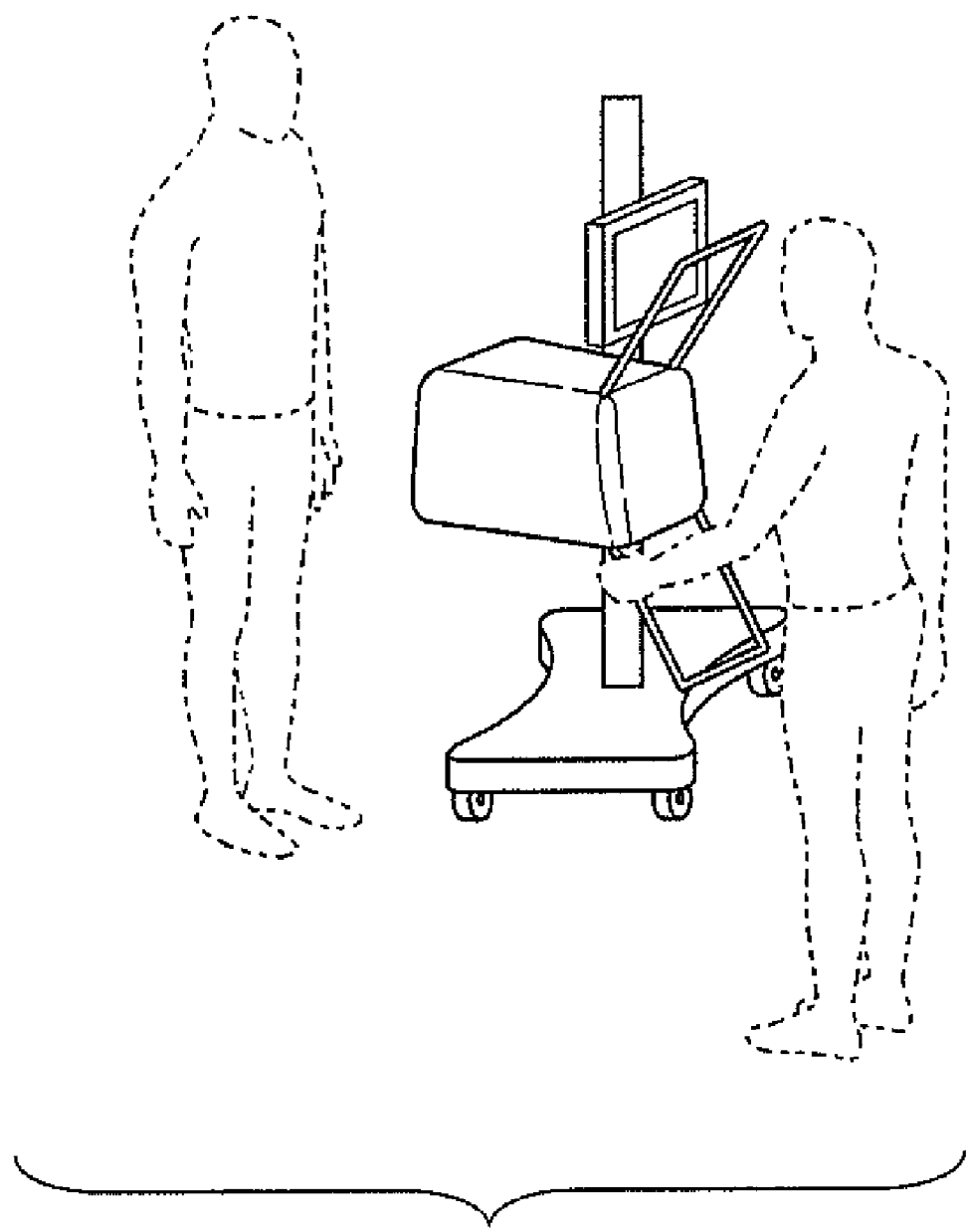
FIG. 26 represents a pictorial representation of yet still another portable embodiment of the system of these teachings.

Referring to FIG. 26, in the embodiment shown therein, the first frame (or an enclosure including or enclosing the frame) is operatively connected to a vertical element and the lower end of the vertical element is attached to a movable platform, such as a platform on wheels. The first frame is operatively connected to the vertical element and movable along the vertical element. In one instance, the device is located on a cart adapted for the purpose and can be moved around the subject. It should be noted that, in some instances, the embodiments shown in FIGS. 25 and 26 may include motorized drivers (and associated control components) to move the device.

Figure 27:
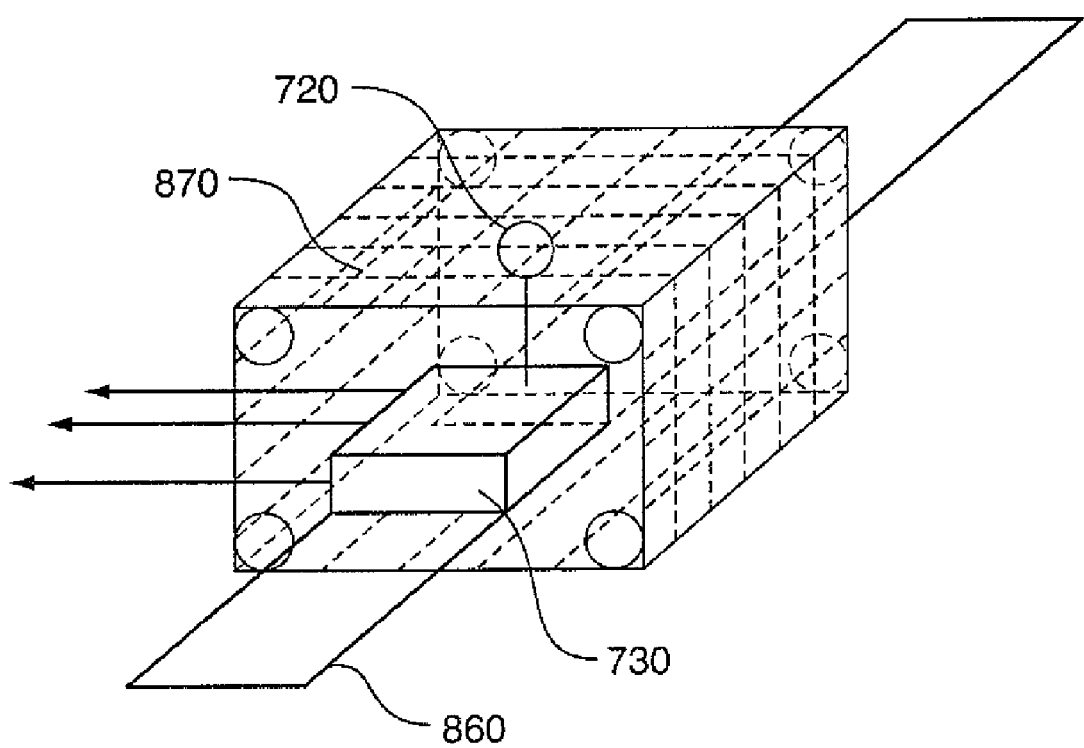
FIG. 27 represents a schematic representation of a handheld embodiment of the system of these teachings.

In the embodiment shown in FIG. 27, the temperature modifying component (or the portion of the first frame to which the temperature modifying component is attached) is enclosed by a second frame 850 on which a material 860 is operatively connected to the second frame so that it is capable of substantially conforming to a portion of the subject (or a portion of the garments covering the subject) being imaged. Handles 860, attached to the first frame and protruding from the second frame, can enable the device to be handheld. In one instance, the second frame is covered by a material 870, such as a net capable of rolling (a rolling net).

Figure 28:
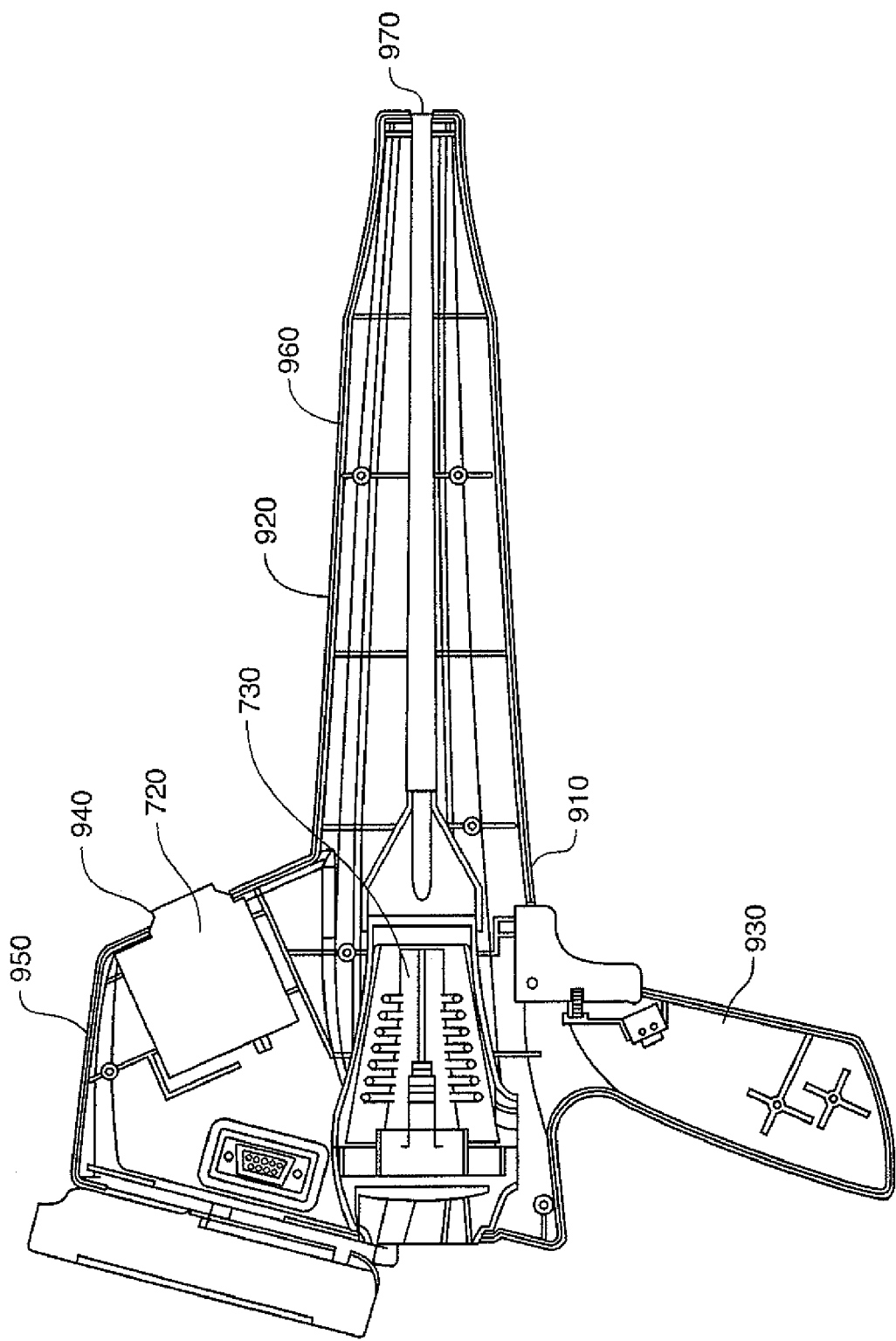
FIG. 28 represents a schematic representation of another handheld embodiment of the system of these teachings.

Another embodiment of the system of these teachings is shown in FIG. 28. Referring to FIG. 28, the system shown therein includes a housing 910. The housing has a top portion 920 and a bottom handle portion 930 angularly joined to the top portion 920. The top portion has a first opening 940 at an upper end 950 and an elongated section 960 protruding away from the upper end 950. The image acquisition device 720 is disposed inside the housing 910 and receives electromagnetic radiation from the emitting body through the opening 940 (opening as used herein, in respect to the first opening, includes a window transparent to electromagnetic radiation). The temperature modifying component 730 is also disposed inside the housing 910. A stream of gas emanates from a second opening at an end of the elongated section 960. Weight and dimensions of the portable system shown in FIGS. 27 and 28 are selected to enable the portable system to be handheld. In one instance, the weight is less than 10 lbs., preferably less than 4 lbs. The handheld system of FIGS. 27 and 28, when emitting body is at least partially covered by a garment, can be utilized together with a a component capable of reducing a fluid layer between at least a portion of the garment and at least a portion the emitting body, such as shown in FIGS. 15, 16a-16c and 17.

The embodiments shown in FIGS. 27 and 28 can be handheld and moved close to the subject being examined (similar to and substituting the procedure of patting and finding hidden or concealed objects). In embodiments in which the emitting body is partially covered by one or more garments, the system of these teachings can also include a component capable of reducing the thickness of a fluid layer between a portion of one or more of the garments and the portion of the emitting body covered by that portion of the one or more garments, such as described hereinabove. In one instance, a material capable of conforming to the subject or the garment covering the subject serves to reduce of fluid layer between the garment and the subject, such as described hereinabove.

Preheating the garment covering the subject enables revealing object under the garments by an infrared camera when source temperature of the object and the garment is initially substantially the same because, after preheating, the temperatures of the object and garment become different due to different thermal conductivities. Hand-held portable devices allow the operator to detect objects at such places of the subject (for example between legs) where standard technologies have blind spots and patting is not a permissible operation. During application of the portable embodiments of the system of these teachings, the presence of concealed objects is detected by modifying a temperature distribution of an emitting body (where the emitting body may contain concealed objects) by means of the portable device, acquiring one or more images produced by the electromagnetic radiation emanating from the emitting body after the temperature distribution has been modified, and providing the one of more images for detection of the presence of concealed objects.

In one instance, as described herein above, the embodiment of the method includes reducing a thickness of a fluid layer between at least a portion of the garment covering the emitting body and at least a portion the emitting body at least partially covered by the garment. In another instance, the embodiment of the method includes increasing detectability of a region of the acquired image.

It should be noted that other embodiments, besides the above described exemplary embodiments, are also within the scope of these teachings.

The techniques described above may be implemented in one or more computer programs executing on a programmable computer including a processor, a storage medium readable by the processor (including, for example, volatile and non-volatile memory and/or storage elements), and, in some embodiments, also including at least one input device, and/or at least one output device. Program code may be applied to data entered using the input device (or user interface) to perform the functions described and to generate output information. The output information may be applied to one or more output devices.

Elements and components described herein may be further divided into additional components or joined together to form fewer components for performing the same functions.

Each computer program (computer readable code) may be implemented in any programming language, such as assembly language, machine language, a high-level procedural programming language, an object-oriented programming language, or a combination thereof. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read. From a technological standpoint, a signal or carrier wave (such as used for Internet distribution of software) encoded with functional descriptive material is similar to a computer-readable medium encoded with functional descriptive material, in that they both create a functional interrelationship with a computer. In other words, a computer is able to execute the encoded functions, regardless of whether the format is a disk or a signal.

Although the invention has been described with respect to various embodiments, it should be realized these teachings are also capable of a wide variety of further and other embodiments within the spirit and scope of the appended claims.

What is claimed is:

1. A portable system for detecting a presence of concealed objects, the system comprising:
    a first frame;
    a temperature modifying component for modifying a temperature distribution of an emitting body; said temperature modifying component altering a thermal balance for said emitting body; said temperature modifying component being operatively connected to said first frame; said temperature modifying component comprising:
        a device capable of directing a stream of gas, heated to substantially a predetermined temperature, at the emitting body;
    an image acquisition device receiving electromagnetic radiation from the emitting body and acquiring an image of the emitting body from the received electromagnetic radiation; said image acquisition device being also operatively connected to said first frame; and
    at least one handle attached to said first frame;
    a weight and dimensions of said first frame, said temperature modifying component and said image acquisition device being selected to enable portability;
    the received electromagnetic radiation from the emitting body, the emitting body having a modified temperature distribution, enabling detection of the presence of concealed objects.

2. The portable system of claim 1 further comprising:
    an analysis component for identifying at least one region in said image, said analysis component being capable of receiving said image from said image acquisition device.

3. The portable system of claim 1 wherein said weight is at most 35 pounds.

4. The portable system of claim 1 further comprising:
    means for providing displacement of said first frame, said temperature modifying component and said image acquisition device.

5. The portable system of claim 4 wherein said means for providing displacement comprise a slidable connector operatively connected to said first frame and to a support structure; said slidable connector being operatively connected to said support structure at a location substantially above said first frame.

6. The portable system of claim 4 wherein said support structure is movable.

7. The portable system of claim 4 wherein said means for providing displacement comprise a support structure having a plurality of components; one component from said support structure providing vertical support; another component being fixedly attached and substantially perpendicular to said component providing vertical support; and at least one other component being attached to said another component by means of a movable connection.

8. The portable system of claim 1 further comprising:
    a second frame surrounding said first frame;
    said at least one handle protruding from said second frame in order to enable the portable system to be handheld; and
    a material capable of substantially conforming to at least a portion of a garment covering at least a portion of said emitting body and to said at least a portion of said emitting body; said material being disposed over a portion of said second frame and disposed between said image acquisition device and said emitting body.

9. The portable system of claim 8 wherein said material comprises an intermeshed material.

10. The portable system of claim 2 wherein said analysis component is also capable of enhancing an image attribute in said at least one region.

11. The portable system of claim 2 wherein said analysis component comprises:
    a pre-processing component capable of enhancing detectability of said at least one region in said at least one image;
    said pre-processing component being capable of receiving said at least one image from said at least one image acquisition device.

12. The portable system of claim 11 wherein said analysis component further comprises:
    a region detecting component capable of identifying said at least one regions in said at least one image and of receiving said at least one image from said pre-processing component; and
    a region analysis component capable of determining characteristics of said at least one region.

13. The portable system of claim 11 wherein said preprocessing component comprises a noise reduction component capable of increasing a signal to noise ratio in said at least one image.

14. The portable system of claim 13 wherein said noise reduction component is an adaptive noise reduction component.

15. The portable system of claim 13 wherein said preprocessing component further comprises a contrast enhancing component capable of enhancing contrast in said at least one image.

16. The portable system of claim 15 wherein said preprocessing component comprises a contrast enhancing component capable of enhancing contrast in said at least one image.

17. The portable system of claim 16 wherein said contrast enhancing component comprises a histogram equalization component.

18. The portable system of claim 17 wherein said contrast enhancing component further comprises an adaptive thresholding component capable of binarizing an output of said histogram equalization component.

19. The portable system of claim 2 further comprising an optimization component;
said analysis component being an adaptive analysis component; and
said optimization component being capable of enabling substantially optimal adaptation of said adaptive analysis component.

20. The portable system of claim 1 wherein said temperature modifying component comprises:
a component providing a stream of gas; and
a heating component disposed to receive the stream of gas and capable of heating the stream of gas to a predetermined temperature; said stream of gas, after heating, being directed at the emitting body.

21. The portable system of claim 1 further comprising:
a display receiving at least one output image from said at least one image acquisition device.

22. The portable system of claim 1 wherein said emitting body is at least partially covered by a garment; the portable system further comprising a component capable of reducing a fluid layer between at least a portion of said garment and at least a portion said emitting body covered by said at least a portion of said garment.

23. The portable system of claim 22 wherein said component comprises a material capable of substantially conforming to said at least a portion of said garment and said at least a portion of said emitting body.

24. The portable system of claim 23 were in said material comprises an intermeshed material.

25. The portable system of claim 1 wherein the portable system is a handheld system; and
wherein the first frame comprises a housing comprising:
a top portion; and
a bottom handle portion angularly joined to said top portion;
said top portion having an opening at an upper end and an elongated section protruding away from said upper end;
said image acquisition device being disposed inside said housing and receiving electromagnetic radiation from the emitting body through said opening;
said temperature modifying component being also disposed inside said housing; said stream of gas emanating from another opening at an end of said elongated section;
weight and dimensions of the portable system being selected to enable the portable system to be handheld.

26. The portable system of claim 25 wherein said weight is at most 10 pounds.

27. A method for detecting a presence of concealed objects, the objects being concealed at locations not accessible for detection by conventional methods, the method comprising the steps of:
modifying, utilizing a handheld system, a temperature distribution of an emitting body by directing at least one stream of heated gas at the emitting body; the modifying comprising altering a thermal balance for the emitting body;
acquiring, utilizing the handheld system, at least one image from electromagnetic radiation emanating from the emitting body after the temperature distribution has been modified; and
providing, to a component of the handheld system, the at least one image for detection of the presence of concealed objects.

28. The method of claim 27 further comprising the step of:
enhancing detectability of at least one region in the at least one acquired image.

29. The method of claim 28 further comprising the steps of:
identifying the at least one region in the at least one image; and
determining characteristics of the at least one region.

30. The method of claim 29 further comprising the step of:
enhancing an image attribute in the at least one region; and
wherein the step of providing the at least one image comprises the step of displaying the at least one image.

31. The method of claim 29 wherein at least one step from the steps of enhancing detectability of at least one region, identifying the at least one region or determining characteristics of the at least one region is performed adaptively; and the method further comprises the step of enabling substantially optimal performance of the at least one adaptive step.

32. The method of claim 28 wherein the step of enhancing detectability of the at least one region comprises the step of increasing a signal to noise ratio in the at least one image.

33. The method of claim 28 wherein the step of enhancing detectability of the at least one region further comprises the step of enhancing contrast in the at least one image.

34. The method of claim 27 wherein the emitting body is at least partially covered by a garment; the method further comprising the step of reducing a thickness of a fluid layer between at least a portion of the garment and at least a portion the emitting body covered by said at least a portion of the garment.

* * * * *